United States Patent [19]
Yoshioka et al.

[11] Patent Number: 5,944,344
[45] Date of Patent: Aug. 31, 1999

[54] AIR BAG DEVICE

[75] Inventors: Kazuhiko Yoshioka; Kazuaki Bito; Yoshinori Mihara; Toru Ozaki, all of Osaka, Japan

[73] Assignee: Toyo Tire & Rubber Co., Ltd., Osaka, Japan

[21] Appl. No.: 09/152,655

[22] Filed: Sep. 14, 1998

Related U.S. Application Data

[62] Division of application No. 08/909,720, Aug. 12, 1997, Pat. No. 5,873,598.

[30] Foreign Application Priority Data

| Aug. 27, 1996 | [JP] | Japan | 8-225067 |
| Jan. 10, 1997 | [JP] | Japan | 9-2775 |
| Feb. 12, 1997 | [JP] | Japan | 9-27875 |

[51] Int. Cl.$^6$ .................................................. B60R 21/26
[52] U.S. Cl. ........................................................ 280/740
[58] Field of Search ................................. 280/740, 729, 280/742, 738, 736, 732

[56] References Cited

U.S. PATENT DOCUMENTS

| 3,602,527 | 8/1971 | Goetz et al. | 280/740 |
| 3,791,671 | 2/1974 | Zens | 280/740 |
| 4,191,392 | 3/1980 | Barnett | 280/740 |
| 5,062,664 | 11/1991 | Bishop et al. | 280/732 |
| 5,407,227 | 4/1995 | Lauritzen et al. | |
| 5,536,041 | 7/1996 | Acker et al. | |
| 5,752,715 | 5/1998 | Pripps et al. | 280/740 |

FOREIGN PATENT DOCUMENTS

| 7-223504 | 8/1995 | Japan . |
| 3-019051 | 9/1995 | Japan . |
| 8-11664 | 1/1996 | Japan . |
| 8-164813 | 6/1996 | Japan . |

*Primary Examiner*—Paul N. Dickson
*Attorney, Agent, or Firm*—Jordan and Hamburg LLP

[57] ABSTRACT

In an air bag device, a diffuser 5 is provided with a partition wall 51 partitioning a space on a case opening side of the diffuser 5 into a passenger side and a side further from the passenger; a gas guiding passage 7 for guiding gas produced by an inflator 4 to a case opening 21 is formed on the side of this partition wall 51 further from the passenger, a folded air bag 3 is packed on the passenger side of the partition wall 51, and a case-side end portion 32a of an air bag upper part 32 to constitute the upper part of the deployed air bag is disposed so as to cover the exit of the gas guiding passage 7. As a result, the end portion 32a of the air bag upper part 32 is expanded first and the air bag subsequently deploys progressively and smoothly from this air bag upper part 32 side in a controlled manner.

5 Claims, 22 Drawing Sheets

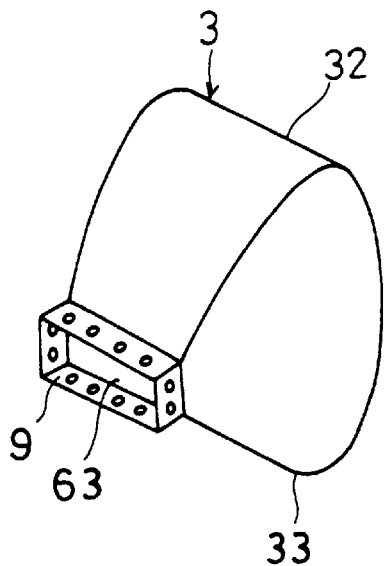
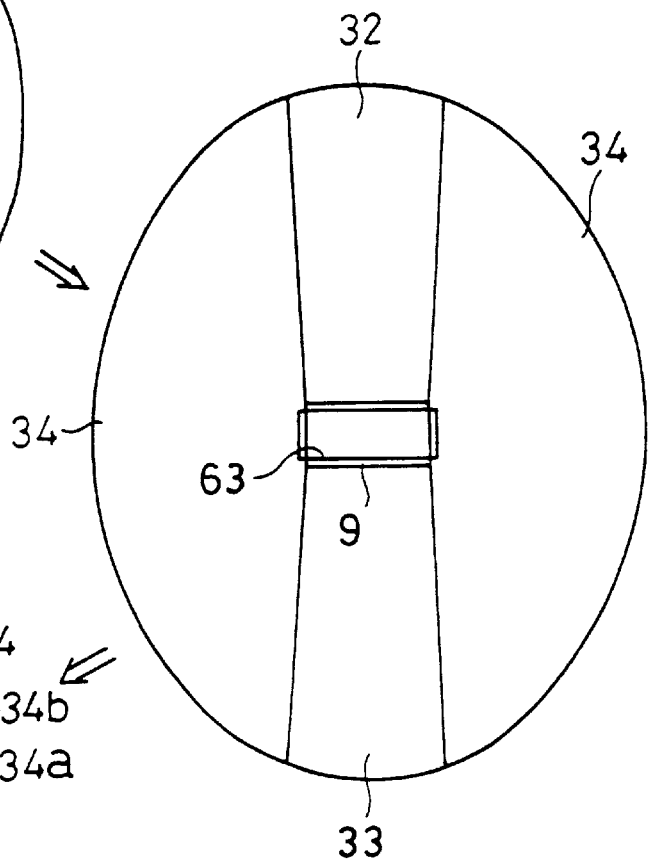
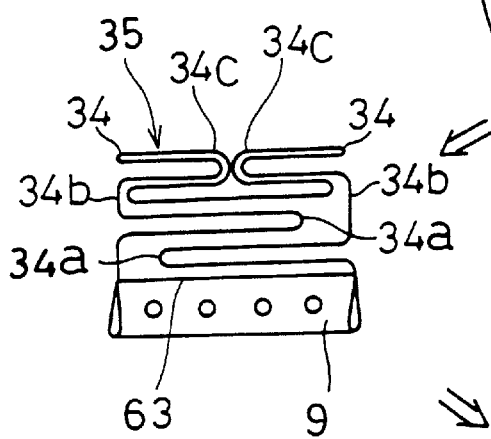
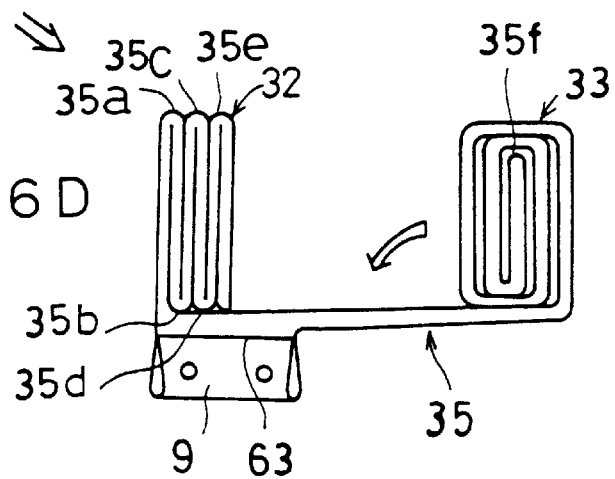

AIR BAG DEVICE

This is a division of application Ser. No. 08/909,720, filed Aug. 12, 1997 now U.S. Pat. No. 5,873,598.

BACKGROUND OF THE INVENTION

This invention relates to an air bag device for protecting a passenger in a vehicle.

An air bag device generally has a case installed in a front panel part of the passenger compartment of a vehicle, such as an instrument panel or the middle of a steering wheel, an air bag received inside the case in a folded state, and an inflator, which is a gas generator. An air bag device is constructed so that in the event of a vehicle collision the air bag is inflated toward the passenger side by gas generated by the inflator and catches the body of the passenger.

To control the deployment behavior of the air bag in this kind of air bag device, JP-B-07090744 discloses an air bag device of which the case is disposed in an instrument panel so as to open upward, the inflator is disposed in the front side of the case, the gas delivery opening of the inflator is disposed in a position more to the front side, and a front side part of the folded air bag is disposed above this gas delivery opening, and as a result of this, when the air bag deploys, this front side part of the air bag is expanded first and the air bag is expanded progressively and freely thereafter.

However, when the gas delivery opening of the inflator is merely disposed nearer front of the inside of the case with a construction wherein a front side part of the folded air bag is disposed above this gas delivery opening as described above, the state of the part of the air bag positioned above the gas delivery opening varies depending on the state of folding and packing of the air bag and has an influence on the deployment behavior of the air bag. Consequently, there has been the problem that it is difficult to control the deployment behavior of the air bag.

In air bag devices of the kind described above, as the arrangement of the inflator and the air bag when the two are installed inside the case, conventionally there have been the series arrangement type shown in FIG. 23 and the parallel arrangement type shown in FIG. 24.

In the series arrangement type shown in FIG. 23, a cylindrical inflator 102 is disposed at the bottom of a case 101 which opens upward, and an air bag 103 is packed on the side of the opening at the top of the case 101.

In the parallel arrangement type shown in FIG. 24, a cylindrical inflator 102 is disposed in the side nearer the front of the vehicle of an upwardly opening case 101, i.e. in the side further from the passenger, and an air bag 103 is packed in the side nearer the rear of the vehicle, i.e. the passenger side.

In the series arrangement type described above, because the air bag 103 and the inflator 102 are disposed in a vertical direction, although it is possible to make the area of the opening in the case 101 small, because the whole of the air bag 103 is pushed out by the gas generated by the inflator 102 it is not easy to control its deployment behavior.

In the parallel arrangement type, because the inflator 102 and the air bag 103 are disposed in a horizontal direction, although the gas generated by the inflator 102 can be made to deploy the air bag 103 from the upper part side thereof, because the area of the opening in the case 101 is large there are many restrictions on the installation of the air bag device in a vehicle.

In the air bag device disclosed in JP-B-07090744 as described above, by disposing a front part of the folded air bag above the inflator, i.e. on the side of the case opening, it is possible to make the area of the case opening smaller than in the above-mentioned parallel arrangement type. However, when the air bag is simply packed extending from the case opening side of the inflator to the passenger side like this, as described above, depending on the state of folding and the state of packing of the air bag, good deployment behavior is not always obtained.

As the above-mentioned inflator, substantially cylindrical ones are known and are used in air bag devices such as those for passenger seat use. In recent years, substantially cylindrical inflators of a hybrid type, charged with high-pressure gas, have been being used. In an inflator of this hybrid type, because a gas blowout part is disposed at one end of the inflator, a diffuser is disposed between the inflator and the air bag to regulate the flow of the gas being fed into the air bag from the inflator. For example constructions such as providing one gas delivery opening in the middle of the diffuser to guide the gas into the middle of the air bag or making a gas delivery opening in the diffuser on the side of the gas blowout part of the inflator small and a gas delivery opening in the diffuser on the opposite side large to balance the amounts of the gas guided into the air bag flowing to the left and right are employed.

Thus, diffusers of the related art have been disposed in order to guide gas into the air bag uniformly in the width direction thereof, and have not positively controlled the shape of the air bag during its deployment by means of their gas delivery openings. Because of this, in air bag devices of the related art, to control the deployment behavior of the air bag, tear seams and tethers have been provided on the air bag itself, and consequently there have been problems such as that the package volume of the air bag is large and that the air bag is expensive.

SUMMARY OF THE INVENTION

It is therefore a main object of the invention to provide an improved air bag device which solves the problems discussed above, and particularly to provide an air bag device which realizes air bag deployment behavior control not influenced by the state of packing of the air bag.

An air bag device provided by a first aspect of the invention has a case having an opening and mounted in a vehicle body, an air bag packed inside the case in a folded state, an inflator for inflating the air bag to the passenger side disposed at the bottom of the case, and a diffuser disposed covering the inflator for regulating the flow of gas generated by the inflator; the diffuser is provided with a partition wall partitioning a space between the diffuser and the case opening inside the case into a passenger side and a side further from the passenger, a gas guiding passage for guiding gas generated by the inflator to the case opening is formed on the side of the partition wall further from the passenger, the folded air bag is received on the passenger side of the partition wall, and a case-side end portion of an air bag upper part to constitute an upper part of the deployed air bag is disposed covering the exit of the gas guiding passage.

In this air bag device, the gas generated by the inflator is guided to the case opening through the gas guiding passage provided on the side of the partition wall further from the passenger and blown into the case-side end portion of the air bag upper part disposed covering the exit of the gas guiding passage. As a result of this, this end portion starts to expand and the folded portion of the air bag disposed on the passenger side of the partition wall inflates progressively from the air bag upper part side. Furthermore, in an air bag device according to the invention, because the space inside the case beside the case opening is divided by the partition wall of the diffuser into a part where a gas guiding passage for guiding gas into the end portion of the air bag upper part is formed and a part for receiving the folded portion of the air bag, the above-mentioned deployment behavior control is realized excellently.

In the air bag device described above, the gas delivery opening of the diffuser may be disposed at the entrance, i.e. at the inflator end, of the gas guiding passage, or may be disposed at the exit, i.e. at the case opening end, of the gas guiding passage. Also, a gas delivery opening may be provided on the passenger side of the partition wall as well as on the gas guiding passage side, i.e. the side of the partition wall further from the passenger. However, in that case, it is necessary for the opening area of the gas delivery opening on the side of the partition wall further from the passenger to be set greater than the opening area of the gas delivery opening on the passenger side of the partition wall. When deployment is to be carried out more preferentially from the above-mentioned air bag upper part side it is preferable for a gas delivery opening to be provided only on the side of the partition wall further from the passenger.

In the air bag device described above, preferably, the inflator is disposed on the side of the inside of the case further from the passenger and the air bag is received as divided between a first receiving part on the passenger side of the inflator and a second receiving part on the case opening side of the inflator. Because as a result of this on deployment of the air bag first the folded portion of the air bag received in the second receiving part inflates and then the folded portion of the air bag received in the first receiving part inflates rapidly thereafter, it is possible to control the deployment order of the air bag. Therefore, it is possible to effect the above-mentioned deployment behavior control well.

In this case, preferably, the case is mounted in the vehicle so as to open upward and the folded portion of the air bag upper part is received in the second receiving part and a folded portion of an air bag lower part to constitute a lower part of the deployed air bag is received in the first receiving part. By this measure it is possible to make the air bag upper part inflate early on deployment of the air bag and form a surface for restraining the passenger and then make the air bag lower part inflate rapidly thereafter.

Also, preferably, the air bag upper part is folded in bellows form and the air bag lower part is folded in roll form. By this measure it is possible to achieve earlier deployment of the air bag upper part.

It is also possible to employ another folding structure, according to such factors as the shape of the air bag, and for example the air bag upper part may be folded in roll form and the air bag lower part also folded in roll form.

With the air bag device of this first aspect of the invention, by the diffuser being provided with a partition wall and the passenger side of this partition wall being made a receiving part for the air bag and a gas guiding passage for blowing gas directly into the case-side end portion of the air bag upper part being formed on the side of the partition wall further from the passenger, it is possible to realize deployment behavior control of the air bag being made to deploy from the air bag upper part side.

An air bag device provided by a second aspect of the invention has a case having an opening and mounted on a vehicle body, an air bag received inside this case in a folded state, and an inflator for inflating the air bag to a passenger side, and the inflator is disposed on the side of the inside of the case further from the passenger and the air bag is received as divided between a first receiving part on the passenger side of the inflator and a second receiving part on the case opening side of the inflator.

In this air bag device, because the air bag is received as divided between a first receiving part on the passenger side of the inflator and a second receiving part on the case opening side of the inflator, when it deploys, first the folded portion received in the second receiving part is inflated and then the folded portion received in the first receiving part is rapidly inflated thereafter, and consequently it is possible to control the deployment order of the air bag. That is, by the air bag being divided into two sections, certain control of its deployment behavior is achieved. Also, as a result of the air bag being packed in two sections like this, the area of the case opening does not become too large, as it does in the parallel arrangement type of the related art described above.

In this air bag device, preferably, the case is mounted in the vehicle so as to open upward and a folded portion of an air bag lower part to constitute a lower part of the deployed air bag is received in the first receiving part and a folded portion of an air bag upper part to constitute an upper part of the deployed air bag is received in the second receiving part. By this measure, at the time of deployment of the air bag, it is possible to make the air bag upper part inflate early and form a surface for restraining the passenger and then make the air bag lower part inflate rapidly thereafter.

In this case, preferably, the air bag lower part is folded in roll form and the air bag upper part is folded in bellows form. By this means it is possible to achieve earlier deployment of the air bag upper part.

It is also possible to employ another folding structure, according to such factors as the shape of the air bag, and for example the air bag upper part may be folded in roll form and the air bag lower part also folded in roll form.

In the air bag device described above, preferably, a diffuser for regulating the flow of the gas generated by the inflator is disposed covering the inflator, and gas delivery openings of the diffuser are disposed so that their opening area on the second receiving part side is greater than their opening area on the first receiving part side. When this is done, because the gas generated by the inflator can be guided preferentially into the folded portion of the air bag received in the second receiving part, it is possible to effect deployment from this second receiving part more smoothly.

In this case, preferably, the diffuser is provided with a partition wall extending toward the case opening side and partitioning the first receiving part from the second receiving part, and by this means it is possible for the gas generated by the inflator to be preferentially guided into the folded portion received in the second receiving part.

With this second aspect of the invention it is possible to provide a compact air bag device wherein the deployment behavior of the air bag is certainly controlled.

An air bag device provided by a third aspect of the invention has received inside a case a substantially cylindrical inflator, an air bag inflated by gas generated by this inflator, and a diffuser disposed covering the inflator for regulating the flow of the gas generated by the inflator; a plurality of gas delivery openings for guiding the gas generated by the inflator into the air bag are provided in the diffuser, and the plurality of gas delivery openings are so disposed that their opening area on a side on which an air bag upper part to constitute an upper part of the deployed air bag is fitted is greater than their opening area on a side on which an air bag lower part to constitute a lower part of the deployed air bag is fitted, so that gas is more guided into the air bag upper part than into the air bag lower part.

Here, the side on which the air bag upper part is fitted and the side on which the air bag lower part is fitted refer to each region of a portion of the diffuser covering the inflator when that portion is divided into two equal-sized regions, that is, a region on which a part to constitute an upper part of the deployed air bag is fitted and a region on which a part to constitute a lower part of the deployed air bag is fitted. And its opening area refers to the total area of the gas delivery openings existing in that region.

In this air bag device, because the total opening area of the gas delivery openings of the diffuser on the side on which the air bag upper part is fitted is greater than the total opening area of the gas delivery openings on the side on which the air bag lower part is fitted, during the initial period of the deployment of the air bag the gas blown out from the inflator is preferentially guided into the air bag upper part. As a result, first the upper part inflates and then the lower part inflates rapidly thereafter to produce a predetermined deployed shape. As a result, a good deployment behavior is obtained.

In this air bag device, the opening area on the side on which the air bag upper part is fitted may be set at greater than 80% of the total opening area of the diffuser. In this case, the above-mentioned preferential guiding of gas into the air bag upper part is secured well.

In this air bag device, the plurality of gas delivery openings may be disposed left-right symmetrical in the diffuser. In this case, gas is guided to the left and right equally and left-right symmetrical deployment is possible.

Also, the opening area of the left and right ends of the diffuser may be set greater than the opening area of the middle of the diffuser. By this means, deployment of the air bag to the sides is promoted and still better deployment behavior can be obtained.

Also, in this air bag device, the plurality of gas delivery openings may be a set of substantially circular small holes. This increases the effect of the diffuser of regulating the gas flow.

In an air bag device according to the third aspect of the invention, a construction may be adopted wherein a substantially cylindrical inflator, an air bag inflated to a passenger side by gas generated by this inflator, and a diffuser for regulating the flow of the gas are disposed inside a case opening upward, the inflator is disposed at the bottom of the case with its axial direction the width direction of the vehicle, the diffuser is a plate member having the axial direction of the inflator as its length direction and disposed so as to cover the inflator, a plurality of gas delivery openings for guiding the gas generated by the inflator into the air bag are formed in this diffuser and this plurality of gas delivery openings are so disposed that their opening area on the side of the center of the diffuser further from the passenger is greater than their opening area on the passenger side of that center.

As a result of this construction, gas blown out from the inflator is guided through the gas delivery openings on the side of the diffuser further from the passenger into the upper part of the air bag and through the gas delivery openings on the passenger side of the diffuser into the lower part of the air bag. Here, because the opening area of the side of the diffuser further from the passenger is greater than the opening area of the passenger side of the diffuser, gas is preferentially guided into the upper part of the air bag and as a result the upper part is inflates first and the lower part inflates rapidly thereafter to produce a predetermined deployed shape. As a result, a good deployment behavior is obtained.

In this case, the opening area of the side further from the passenger is preferably set to over 80% of the total opening area of the diffuser. When this is done, the above-mentioned preferential guiding of gas into the air bag upper part is secured well.

With an air bag device of the third aspect of the invention, as a result of the improved opening pattern of the gas delivery openings of the diffuser, on deployment of the air bag the upper part is inflated first and the lower part is rapidly inflated thereafter, and therefore a desirable deployment behavior can be achieved easily without separately providing deployment control means such as tethers.

BRIEF DESCRIPTION OF THE DRAWINGS

FIG. 16A through FIG. 16D are views illustrating the folding structure of an air bag in the seventh preferred embodiment;

DETAILED DESCRIPTION OF THE PREFERRED EMBODIMENTS

Preferred embodiments of air bag devices according to the invention will now be described with reference to the accompanying drawings.

Figure 1:
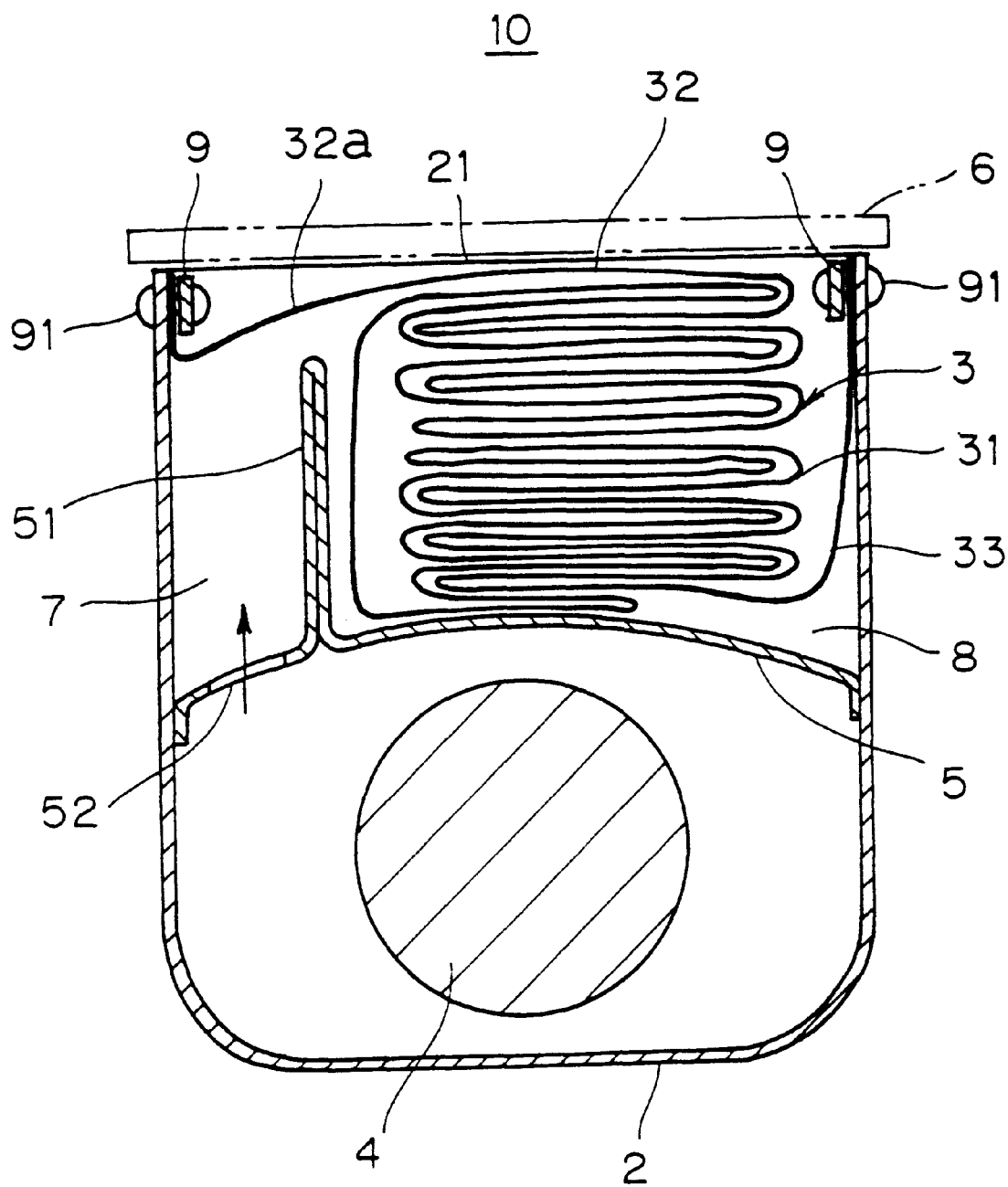
FIG. 1 is a vertical sectional view of an air bag device 10 of a first preferred embodiment of the invention.
Figure 2:
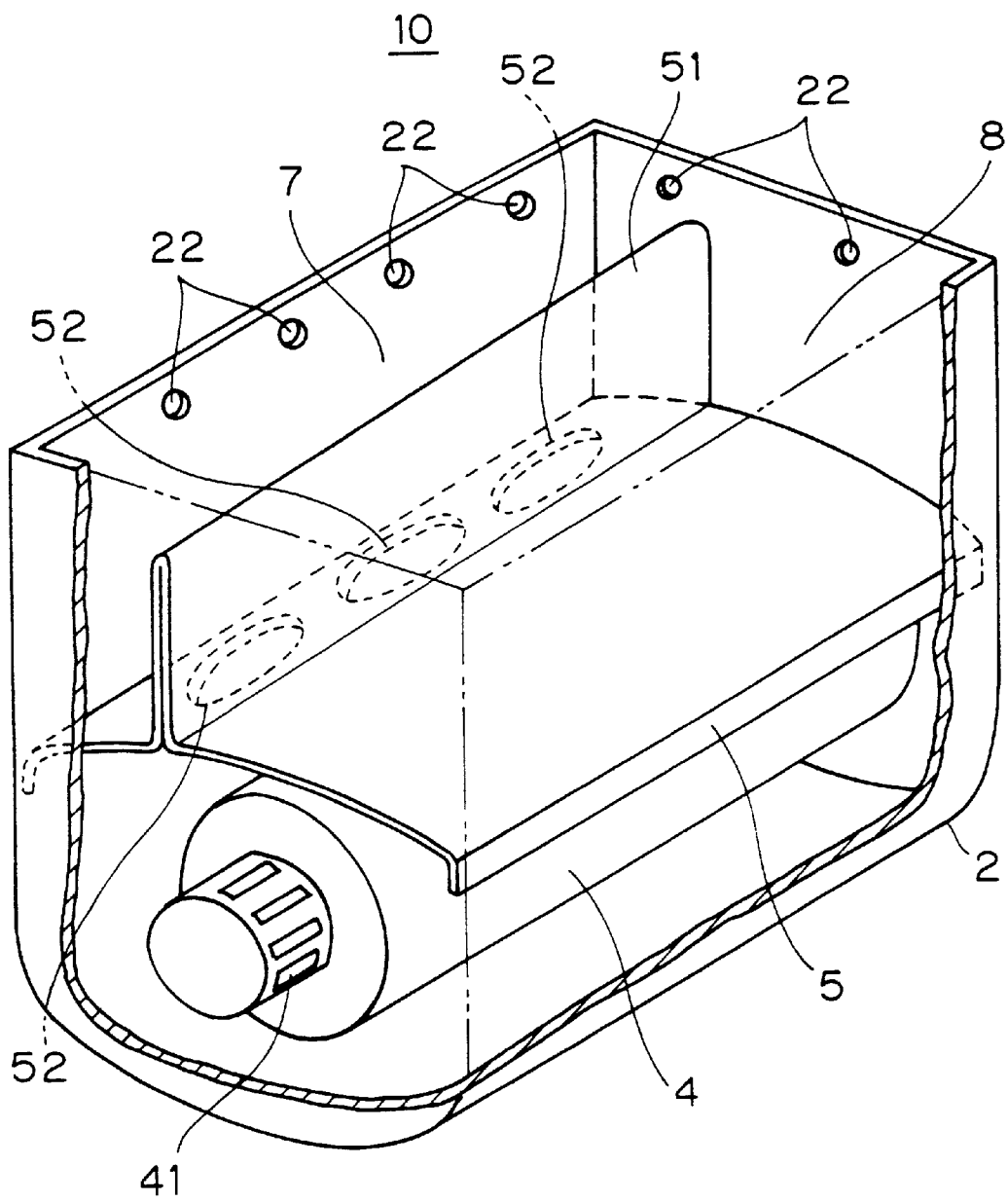
FIG. 2 is a partial cutaway perspective view of the air bag device 10.
Figure 3A:
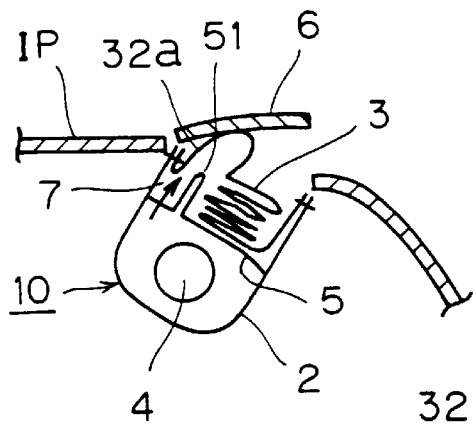
FIG. 3A through FIG. 3C are sectional views showing the deployment behavior of an air bag 3 in the air bag device 10.
Figure 3B:
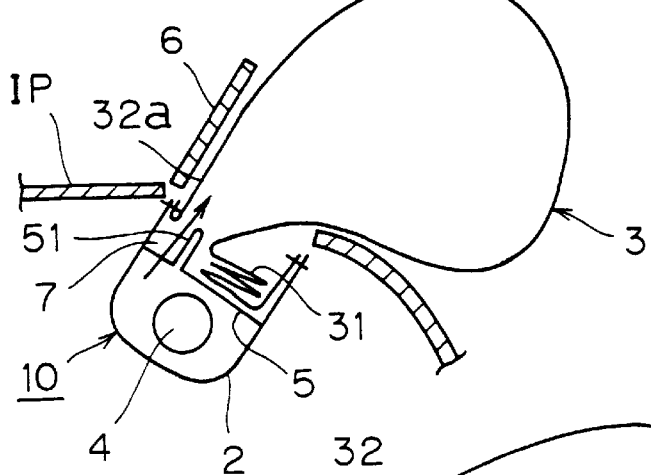
Figure 3C:
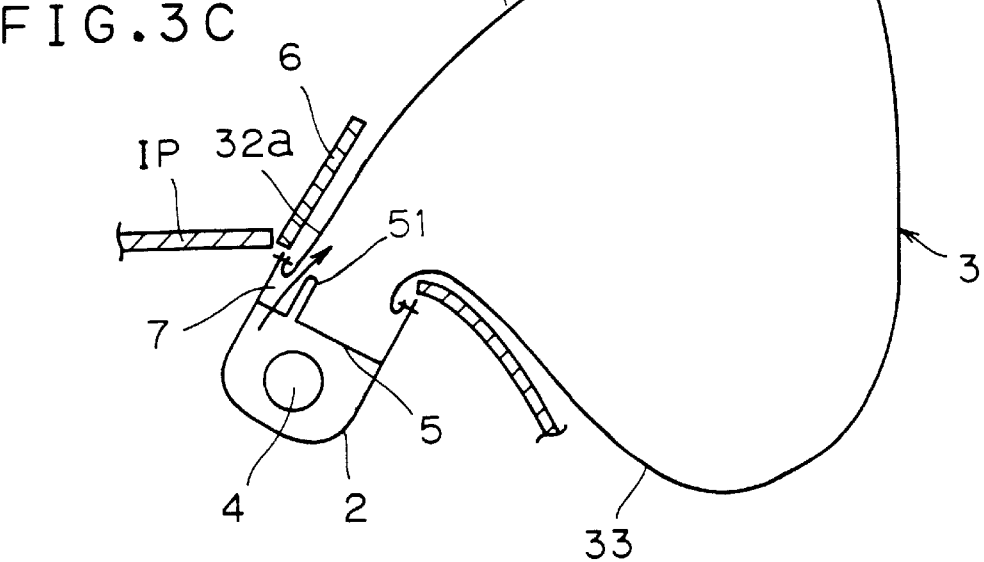

FIG. 1 is a sectional view of an air bag device 10 of a first preferred embodiment of the invention, FIG. 2 is a partial cutaway perspective view of the air bag device 10, and FIGS. 3A through 3C are sectional views showing the deployment behavior of the air bag of the air bag device 10.

This air bag device 10 is made up of an upwardly opening case 2 mounted in an instrument panel IP in front of the passenger seat of a car, an air bag 3 packed in a folded state into this case 2, a cylindrical inflator 4, which is a gas generator, and a diffuser 5 for regulating a flow of gas generated by the inflator 4. The device is so constructed that in the event of a collision, gas generated by the inflator 4 inflates the air bag 3 toward the rear of the vehicle to catch the body of the passenger. A cover 6 covers the case opening 21 and is constructed to be opened by the inflation pressure of the air bag 3.

The case 2 is a boxlike container made of metal having a rectangular opening 21. This case 2, as shown in FIGS. 3A through 3C, is mounted in an upper face of the instrument panel IP so as to open substantially upwardly. More specifically, the case 2 is mounted with its lower end inclined slightly toward the front of the vehicle.

The inflator 4 is fitted at the bottom of the inside of the case 2 with its axial direction extending in the width direction of the vehicle, and is disposed substantially centrally in the front-rear direction of the case 2. As shown in FIG. 2, this inflator 4 is a hybrid type charged with high-pressure gas, and has a gas blowout part 41 at one end. The inflator 4 is not limited to this hybrid type having a gas blowout part 41 at one end, and may be one having a gas blowout part extending over its entire length.

The diffuser 5 is made of a sheet metal material and is attached by welding, rivets or nuts and bolts to the inner sides of the case 2 so as to cover the inflator 4 from the case opening 21 side. This diffuser 5 divides the inside of the case 2 into a space in the bottom side of the case in which the inflator 4 is housed and a space in the case opening 21 side in which the air bag 3 is received.

In the diffuser 5, a partition wall 51 partitioning the space in the case opening 21 side into a passenger side, i.e. rear side in the front-rear direction of the vehicle, and a side further from the passenger, i.e. front side in the front-rear direction of the vehicle is formed to be projected from the diffuser surface toward the case opening 21 side. This partition wall 51 is disposed in a position more to the side further from the passenger with respect to the front-rear direction center of the case 2, and extends across the full width of the case 2. The height of the partition wall 51 is set so that it is slightly set back from the case opening 21 toward the case bottom side. Due to this partition wall 51, a gas guiding passage 7 which guides gas generated by the inflator 4 from the space in the bottom side of the case 2 to the case opening 21 is formed between the partition wall 51 and the wall of the case 2 on the side further from the passenger. Also, an air bag receiving part 8 in which the folded air bag 3 is received is formed on the passenger side of the partition wall 51.

Delivery openings 52 for delivering gas generated by the inflator 4 into the air bag 3 are formed in the diffuser 5 on the side of the partition wall 51 further from the passenger. These delivery openings 52 are disposed at the lower end, i.e. the entrance end, of the gas guiding passage 7, and as shown in FIG. 2 they are each of a closed-curve shape such as a substantially circular shape and are arrayed in a plurality (for example three) in the width direction of the case 2. This diffuser 5 having the partition wall 51 may be formed integrally by press molding or the like or may be formed by fixing a partition wall 51 to the diffuser surface or to the case by means such as welding.

The air bag 3 is a bag sewn in a three-dimensional shape using a cloth made of a synthetic fiber or the like and having a mounting opening, and this mounting opening is attached to the inner side of the case opening 21 by means of rivets 91 and an air bag retainer 9. This air bag 3 is folded in a predetermined form and its folded portion 31 is received in the air bag receiving part 8 on the passenger side of the partition wall 51 as mentioned above. A mounting end portion 32a for attaching to the case 2 of an air bag upper part 32 to constitute an upper part of the deployed air bag 3, that is, of the shape of the air bag on completion of its deployment shown in FIG. 3C, is led out from the above-mentioned folded portion 31 and is disposed so that it covers the vicinity of the exit of the gas guiding passage 7, that is, the top of the gas guiding passage 7.

The air bag 3 is folded in bellows form in its vertical direction, as shown in FIG. 1, in order to effectively obtain progressive deployment from the air bag upper part 32 at the time of inflation. That is, it is folded so that its folds are superposed on each other from the air bag upper part 32 to an air bag lower part 33 to constitute a lower part of the deployed air bag.

As shown in FIG. 2, insertion holes 22 for the rivets 91 for mounting the air bag 3 on the case 2 are provided in the case 2. In FIG. 2, and also in FIG. 7 and FIG. 10, which will be discussed later, the air bag 3 is not shown.

In this air bag device 10, as shown in FIG. 3A, at the time of a vehicle collision, gas generated by the inflator 4 is guided through the gas guiding passage 7 to the case opening 21 and delivered to the mounting end portion 32a of the air bag upper part 32 disposed thereabove. As a result, this mounting end portion 32a starts to expand, and this expansion pressure opens the cover 6. Then, as shown in FIG. 3B, starting with the air bag upper part 32, the folded portion 31 of the air bag 3 is pulled out and progressively deployed. When the whole of the folded portion 31 has been pulled out, as shown in FIG. 3C, deployment ends.

Thus, in this air bag device 10, from the initial period of its deployment the air bag 3 can be made to deploy progressively from the air bag upper part 32 side to the air bag lower part 33 side. Consequently, the air bag 3 can be made to deploy smoothly, and good deployment behavior can be obtained. Furthermore, because the above-mentioned space on the case opening 21 side of the case 2 is divided by the partition wall 51 of the diffuser 5 into the gas guiding passage 7 for guiding gas to the mounting end portion 32a of the air bag upper part 32 and the air bag receiving part 8 in which the folded portion 31 of the air bag 3 is received, the above-mentioned deployment behavior can be obtained satisfactorily.

Figure 4:
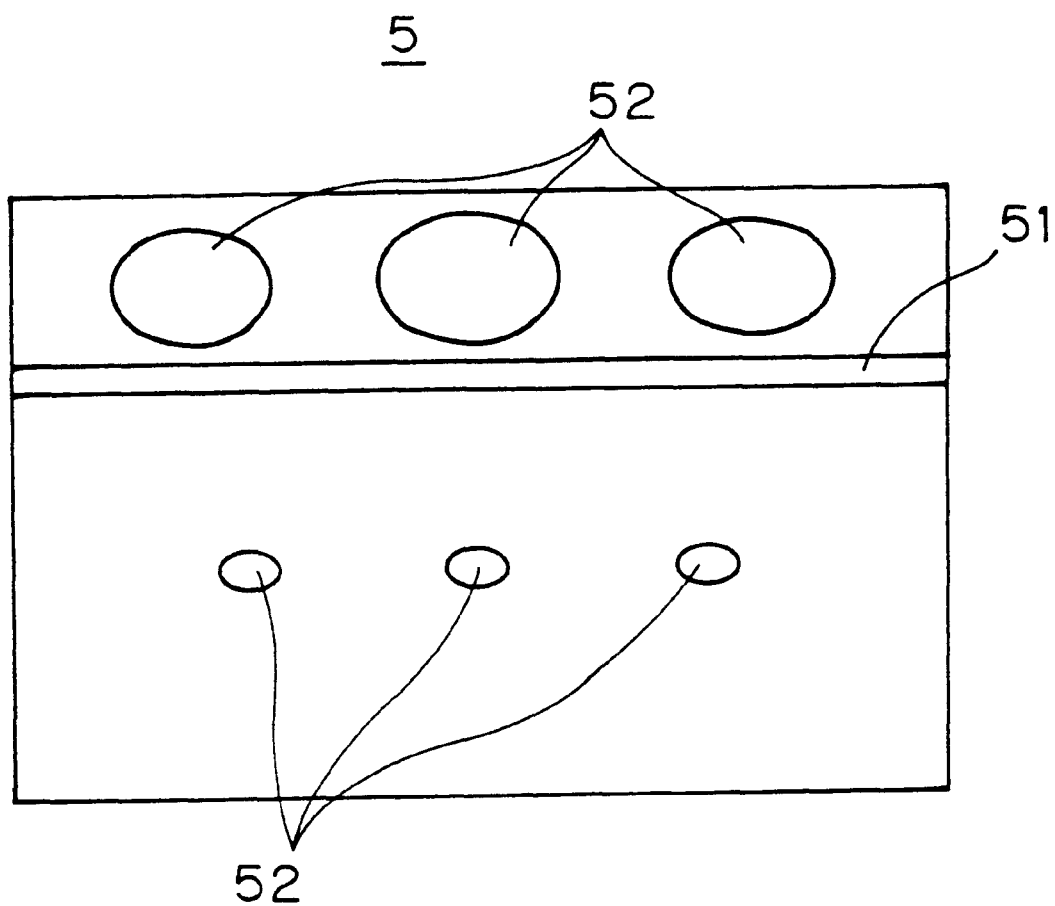
FIG. 4 is a plan view showing a modification example of a diffuser 5 in the air bag device 10.

Although in the preferred embodiment described above the delivery openings 52 of the diffuser 5 were disposed only on the side of the partition wall 51 further from the passenger, delivery openings 52 may be provided on both that side and the passenger side of the partition wall 51. However, in that case, it is necessary for the delivery openings 52 to be so provided that the total delivery opening area on the side of the partition wall 51 of the diffuser 5 further from the passenger is greater than the total delivery opening area on the passenger side. For example, as shown in FIG. 4, large delivery openings 52 may be provided on the side of the partition wall 51 further from the passenger with smaller delivery openings 52 being provided on the passenger side.

Figure 5:
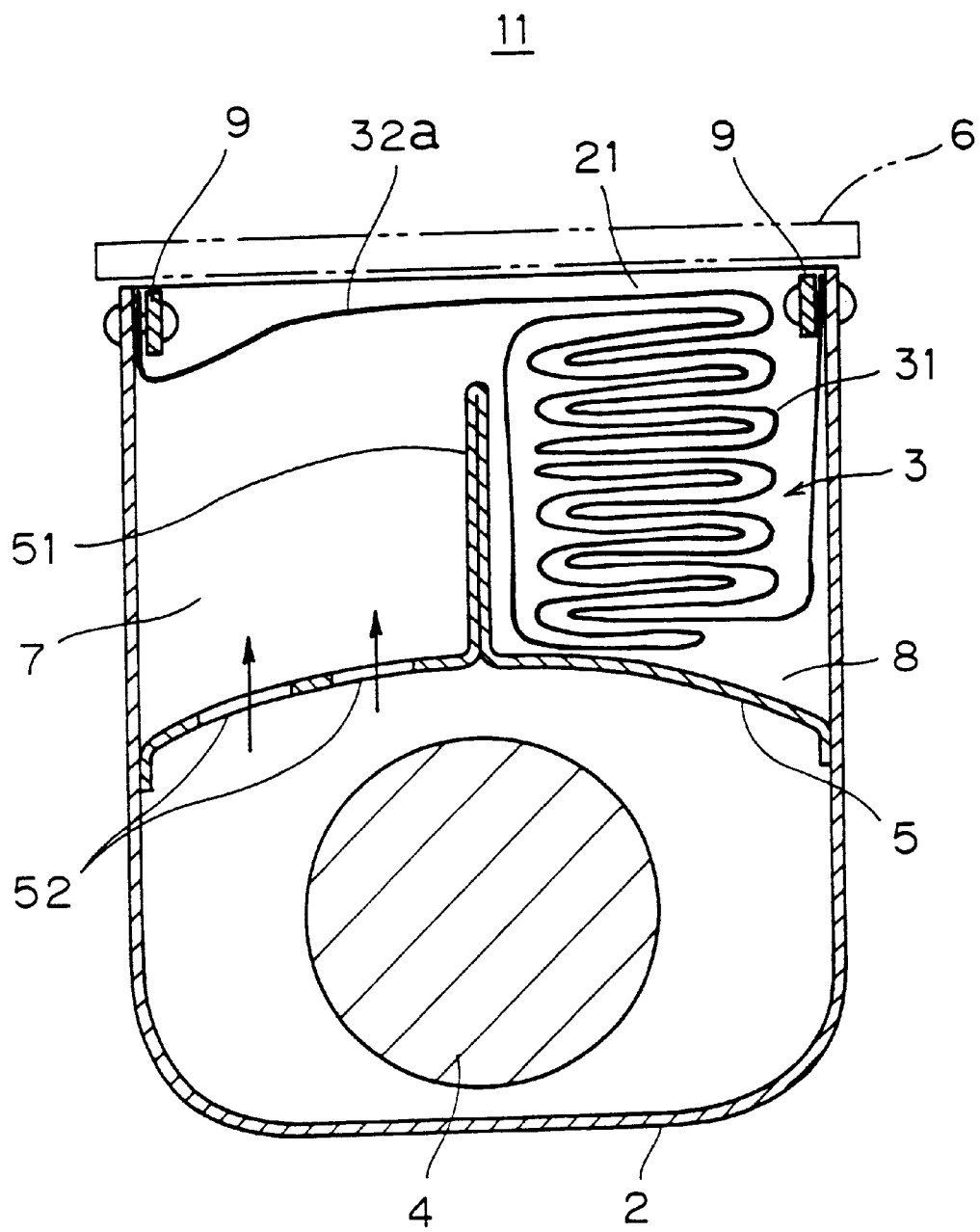
FIG. 5 is a vertical sectional view of an air bag device 11 showing an example wherein the position of a partition wall 51 of the diffuser 5 in the first preferred embodiment has been changed.

Also, although in the preferred embodiment described above the partition wall 51 was disposed more to the side further from the passenger with respect to the front-rear direction center of the inside of the case 2, it may alternatively be disposed substantially centrally in the front-rear direction of the case 2, as in the air bag device 11 shown in FIG. 5. However, from the viewpoint of making the area of the opening of the case 2 small it is preferable for the partition wall 51 to be disposed on the side of the case 2 further from the passenger, as it is in the preferred embodiment described above.

Figure 6:
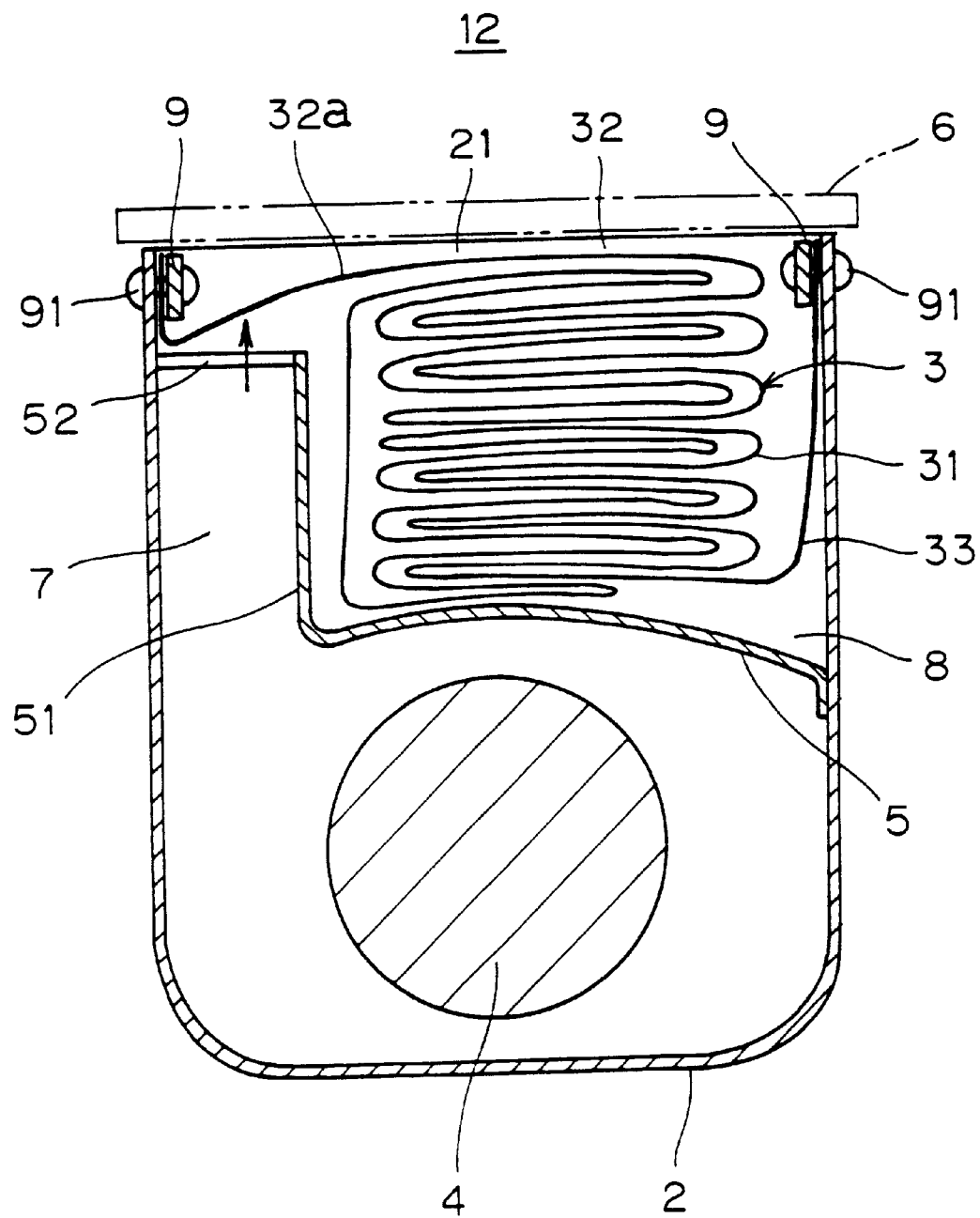
FIG. 6 is a vertical sectional view of an air bag device 12 of a second preferred embodiment of the invention.
Figure 7:
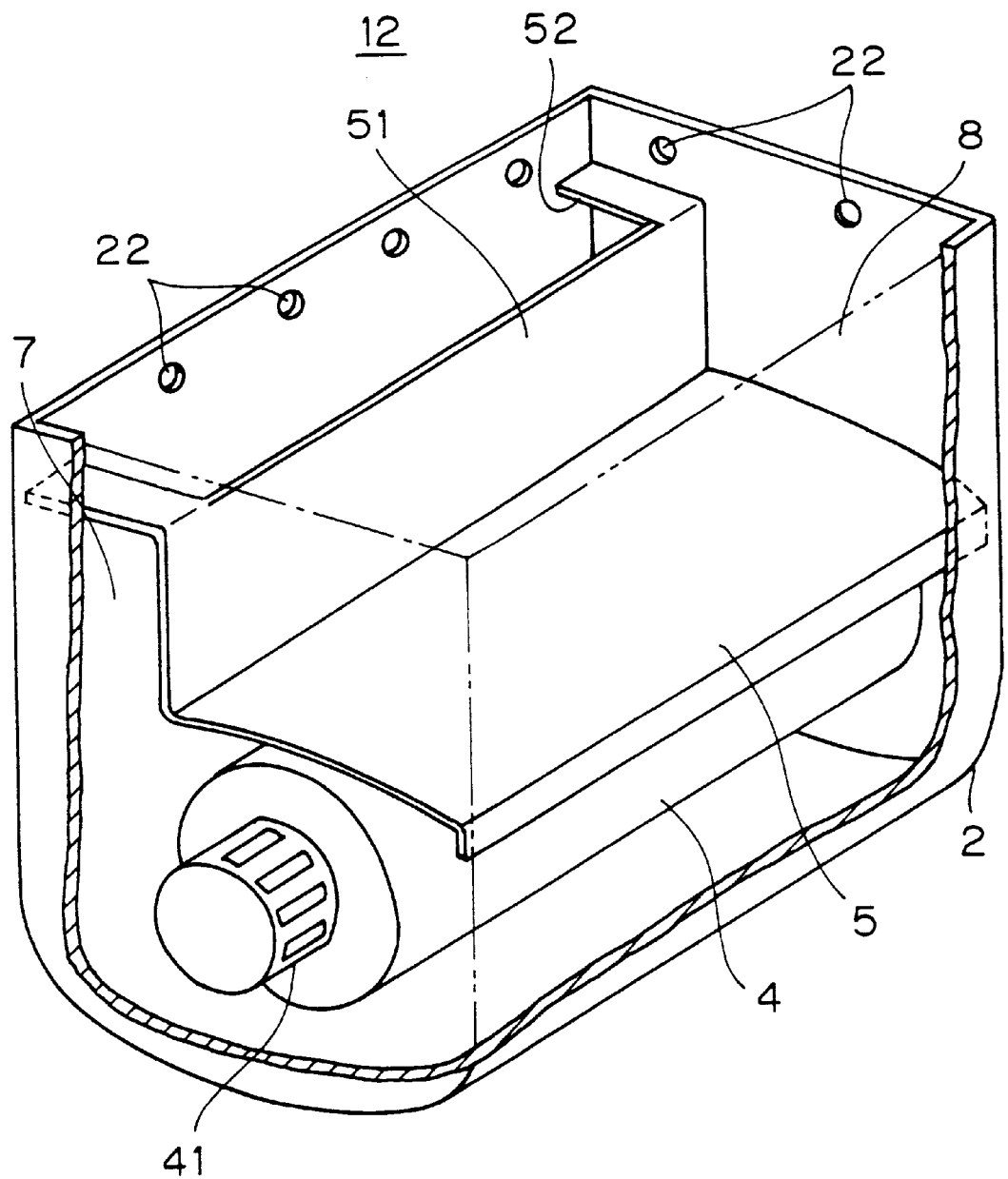
FIG. 7 is a partial cutaway perspective view of the air bag device 12.

FIG. 6 is a sectional view of an air bag device 12 of a second preferred embodiment of the invention, and FIG. 7 is a partial cutaway perspective view of the same air bag device 12.

This preferred embodiment differs from the first preferred embodiment described above in the point that the gas delivery opening 52 of the diffuser 5 is provided at the upper end, i.e. the exit end, of the gas guiding passage 7. That is, in this preferred embodiment, the diffuser 5 is made up of a partition wall 51, a part extending from the lower end of this partition wall 51 to the passenger side wall of the case 2, and a part extending from the upper end of the partition wall 51 to the wall of the case 2 on the side further from the passenger, and the gas delivery opening 52 is formed in this part extending to the wall on the side further from the passenger. As shown in FIG. 7, the gas delivery opening 52 consists of a rectangular opening formed over almost the entire region of said part extending to the wall on the side further from the passenger.

In this preferred embodiment also, the same effects as those of the first preferred embodiment are obtained, and also, because the gas flow is regulated by the gas guiding passage 7, it is possible to obtain stable deployment behavior of the air bag 3 even if the gas delivery opening 52 is a rectangular opening as described above.

Figure 8:
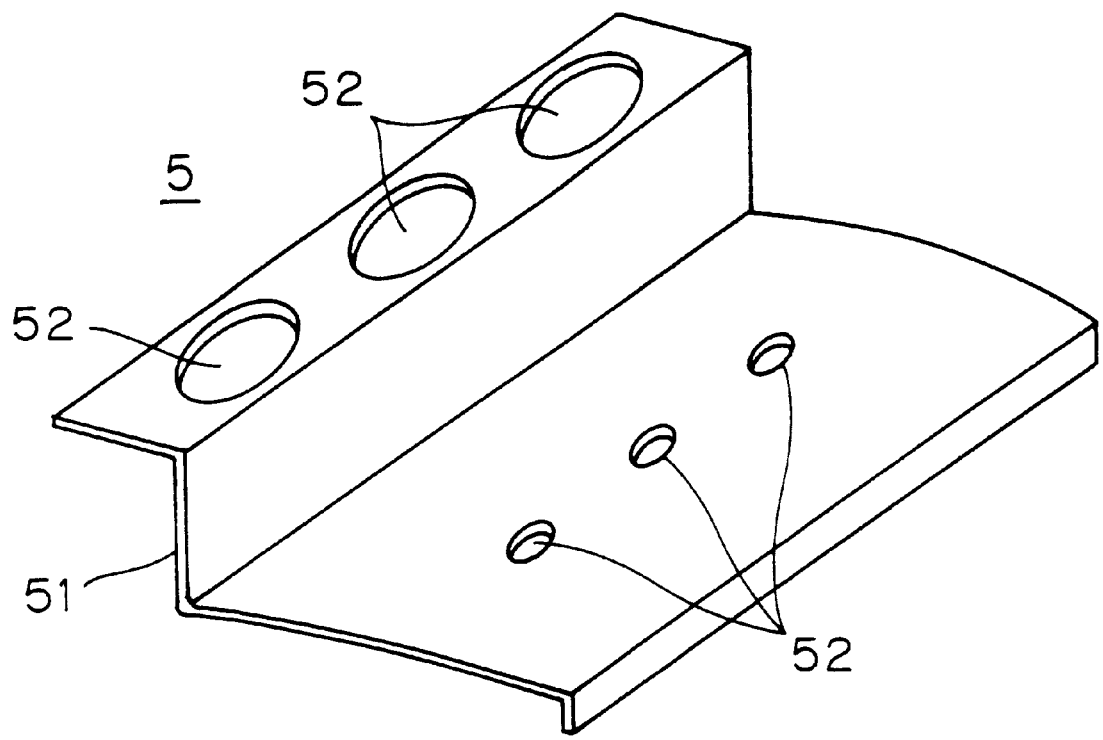
FIG. 8 is a perspective view showing a modification example of a diffuser 5 in the air bag device 12.

As shown in FIG. 8, in this preferred embodiment also, a plurality of delivery openings 52 may be provided in the diffuser 5, as in the first preferred embodiment. Also, to an extent such that they do not impair the above-mentioned effects, delivery openings 52 may also be provided on the passenger side of the partition wall 51.

Figure 9:
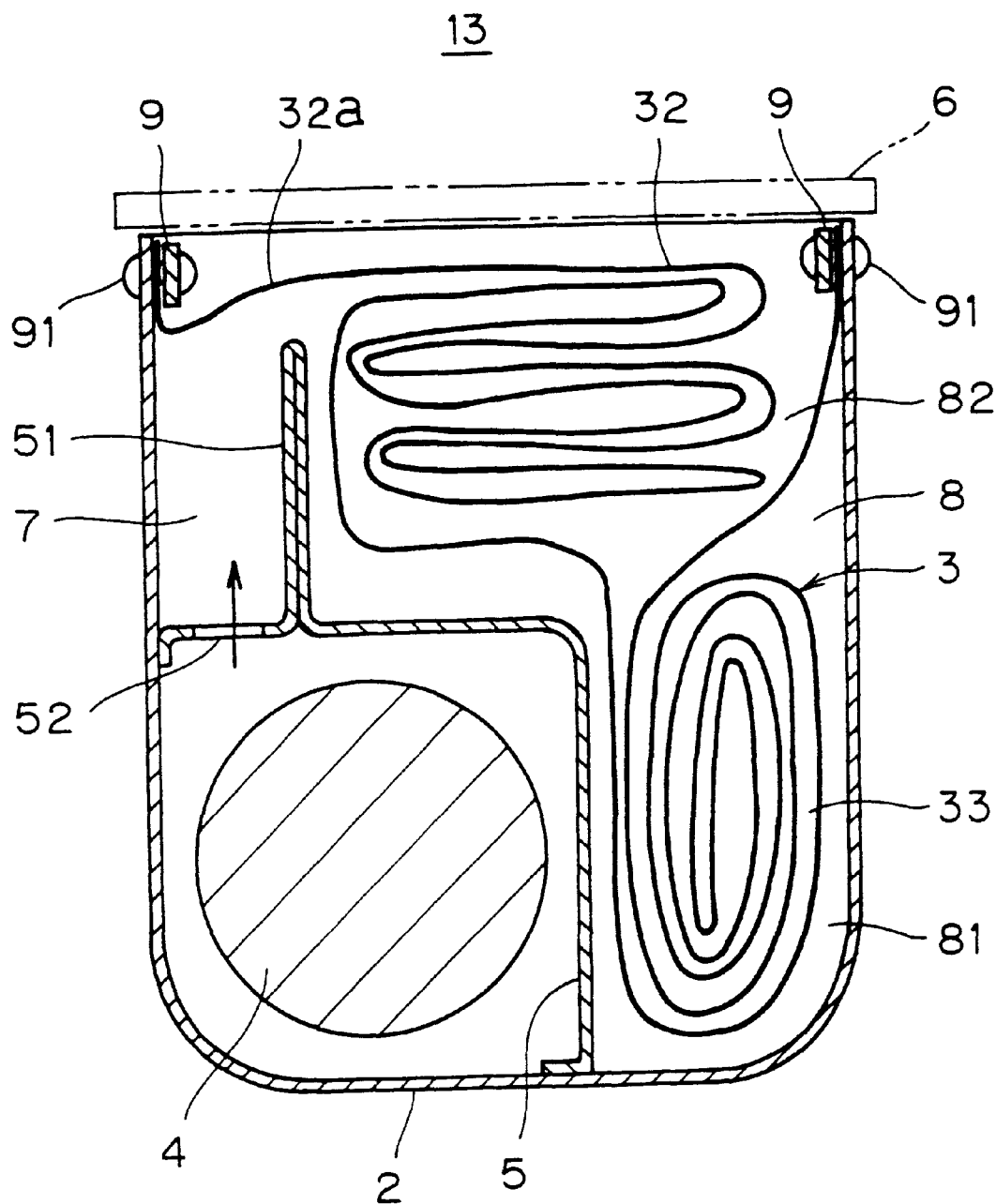
FIG. 9 is a vertical sectional view of an air bag device 13 of a third preferred embodiment of the invention.
Figure 10:
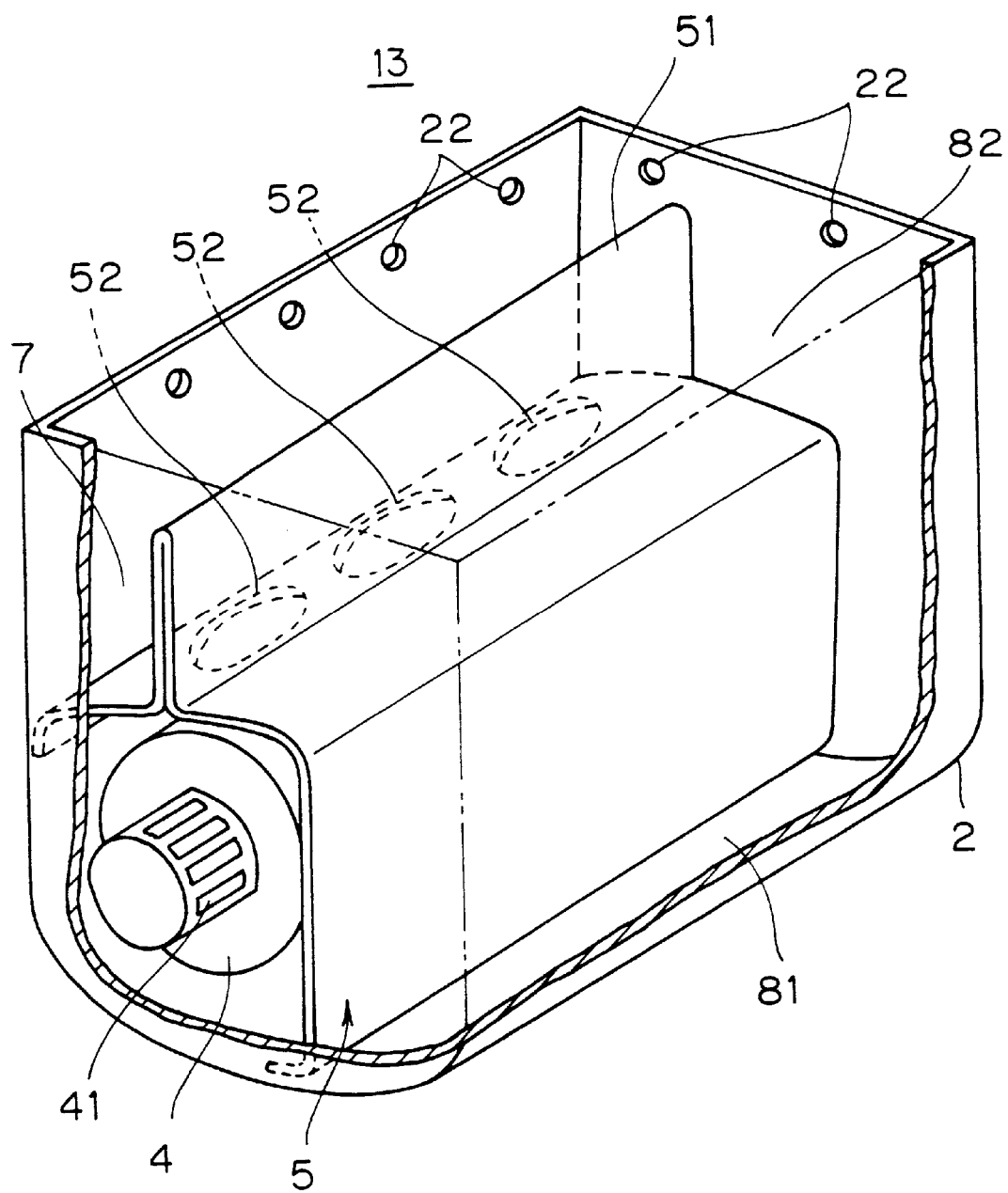
FIG. 10 is a partial cutaway perspective view of the air bag device 13.

FIG. 9 is a sectional view of an air bag device 13 of a third preferred embodiment of the invention, FIG. 10 is a partial cutaway perspective view of the air bag device 13, and FIG. 11 is a sectional view illustrating the expansion and deployment movement of the air bag 3 in this preferred embodiment.

This preferred embodiment differs from the first preferred embodiment described above in the point that the inflator 4 is disposed shifted from the approximate front-rear direction center of the case 2 to the side further from the passenger, and a receiving part for the air bag 3 is also provided on the passenger side of the inflator 4.

That is, the inflator 4 is disposed in the proximity of the bottom and the side wall further from the passenger of the case 2. The diffuser 5 is mounted so as to cover the inflator 4 from the passenger side and the case opening side. The receiving part 8 for the air bag 3 is made up of a first receiving part 81 formed on the passenger side of the inflator 4, between a passenger side wall of the diffuser 5 and the passenger side wall of the case 2, and a second receiving part 82 on the case opening 21 side of the inflator 4 and bounded by a wall of the diffuser 5 on the case opening 21 side, the passenger side wall of the case 2, and the partition wall 51.

Also, the folded portion of the air bag upper part 32 of the air bag 3 is received in the second receiving part 82 and the folded portion of the air bag lower part 33 of the air bag 3 is received in the first receiving part 81 so that the air bag 3 is divided into two sections. That is, the air bag 3 is folded so that the upper part 32 and the lower part 33 thereof each form a folded portion, and these folded portions are received in the respective receiving parts 82, 81.

More specifically, the air bag 3 is spread in a plane by the air bag upper part 32 and the air bag lower part 33 being pulled up and down and in this state the left and right sides of the air bag are folded to the width of the case 2 to form a vertically long bandlike body and then, as shown in FIG. 9, the air bag lower part 33 constituting the lower part of this bandlike body is folded in roll form and fitted into the first receiving part 81 and the air bag upper part 32 constituting the upper part of the bandlike body is folded in bellows form and fitted into the second receiving part 82.

Figure 11A:
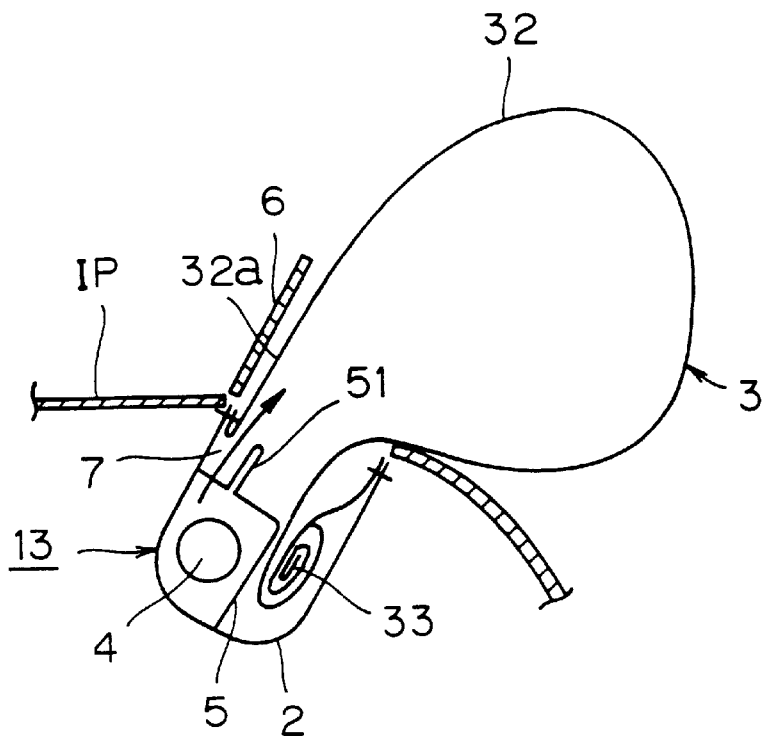
FIG. 11A and FIG. 11B are sectional views showing the deployment behavior of an air bag 3 in the air bag device 13.
Figure 11B:
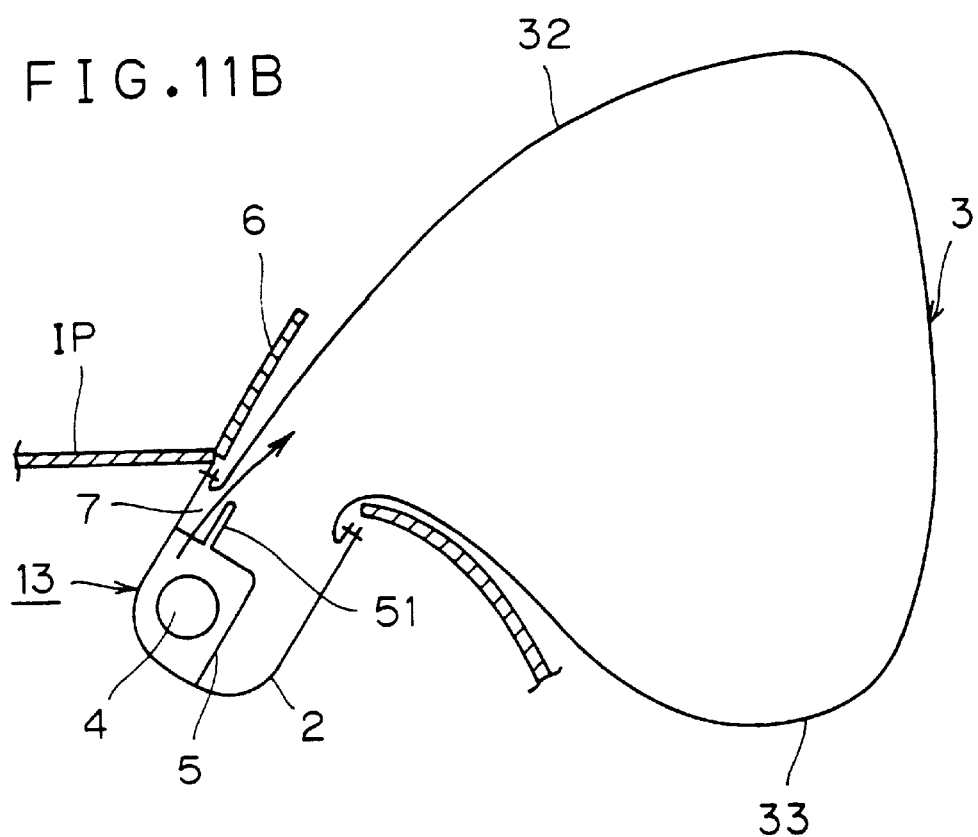

In this air bag device 13, at the time of a vehicle collision, gas generated by the inflator 4 is blown through the gas guiding passage 7 to the mounting end portion 32a of the air bag upper part 32. As a result, as shown in FIG. 11A, the folded portion of the air bag upper part 32 expands early and forms a surface for restraining the passenger. Then, as shown in FIG. 11B, the folded portion of the air bag lower part 33 expands while being rapidly pulled out by the air bag upper part 32.

By the folded portions of the air bag upper part 32 and the air bag lower part 33 being received separately in this way, the air bag upper part 32 can be made to expand early and the air bag lower part 33 can be made to expand rapidly after that, and certain deployment behavior control is achieved.

Also, because the air bag upper part 32 received in the second receiving part 82 is folded in bellows form the expansion of this air bag upper part 32 is made faster, and control of the deployment behavior becomes possible.

From the point of view of making the area of the case opening small, the front-rear direction dimension of the first receiving part 81 is preferably made as small as is possible with it still being possible for the folded portion of the air bag lower part 33 to be received in it.

Also, if the total opening area of the delivery openings 52 of the diffuser 5 on the side of the partition wall 51 further from the passenger is made large, as in the preferred embodiments described above it is possible to provide delivery openings 52 on the passenger side of the partition wall 51 also. This point similarly applies in the preferred embodiments described hereinafter.

Figure 12:
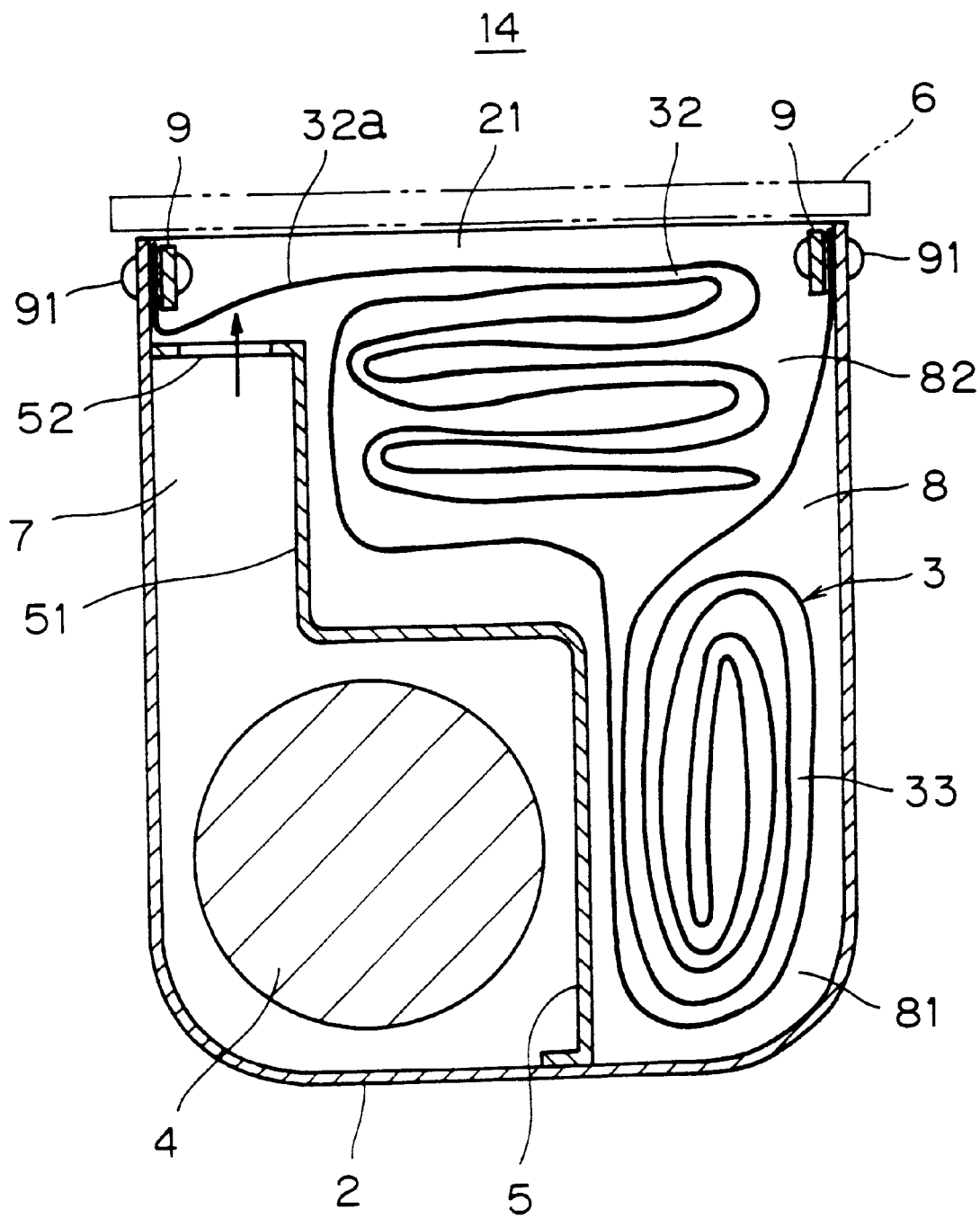
FIG. 12 is a vertical sectional view of an air bag device 14 of a fourth preferred embodiment of the invention.

FIG. 12 is a sectional view of an air bag device 14 of a fourth preferred embodiment of the invention. This preferred embodiment is basically similar to the third preferred embodiment described above but has the feature that as in the second preferred embodiment described above the gas delivery opening 52 of the diffuser 5 is disposed at the exit end of the gas guiding passage 7. In this case also, similar effects to those of the third preferred embodiment are obtained, and also, because the gas flow is regulated by the gas guiding passage 7, it is possible to obtain stable deployment behavior of the air bag 3 even if the gas delivery opening 52 is a rectangular opening as described above.

Figure 13:
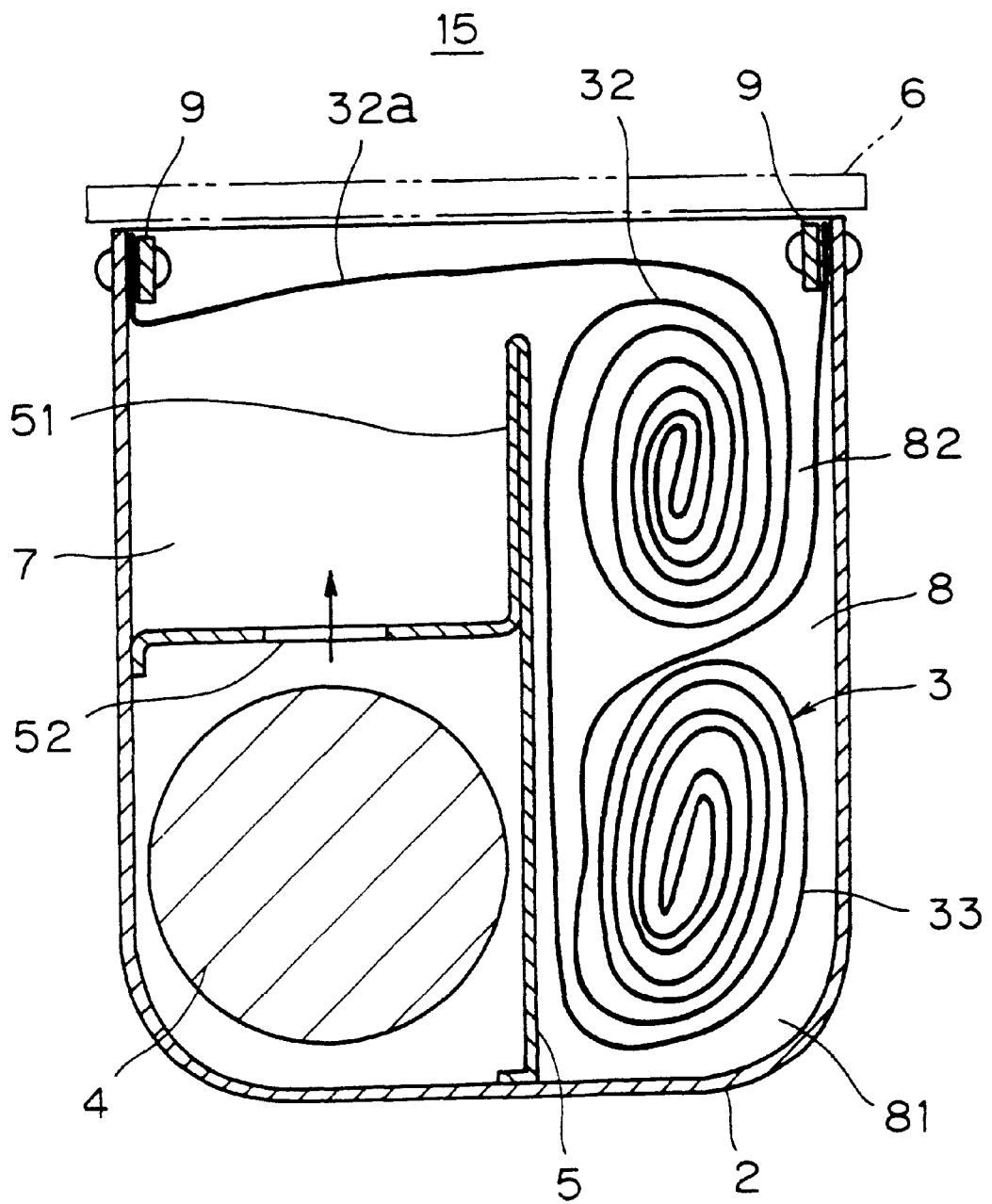
FIG. 13 is a vertical sectional view of an air bag device 15 of a fifth preferred embodiment of the invention.

FIG. 13 is a sectional view of an air bag device 15 of a fifth preferred embodiment of the invention. In this preferred embodiment, the position of the partition wall 51 is different from in the third preferred embodiment described above. That is, in this preferred embodiment, the passenger side wall of the diffuser 5 is extended upward toward the case opening 21 and this extension part is made the partition wall 51 for partitioning the gas guiding passage 7 from the air bag receiving part 8. In this case, because it is possible to make the gas guiding passage 7 large, the efficiency of supply of gas to the air bag 3 is excellent. However, from the point of view of making the area of the case opening small the third preferred embodiment described above is better.

In this preferred embodiment, the air bag upper part 32 received in the second receiving part 82 and the air bag lower part 33 received in the first receiving part 81 are both folded in roll form. When the upper part 32 and the lower part 33 are received separately in the second receiving part 82 and the first receiving part 81 like this, their folding structure is not limited to the structures of the third and fourth preferred embodiments described above wherein the air bag upper part 32 is folded in bellows form and the air bag lower part 33 is folded in roll form, and can be made another folding structure according to the shape of the air bag 3 and the elements constituting the device. For example, both the air bag upper part 32 and the lower part 33 may be folded in bellows form.

Figure 14:
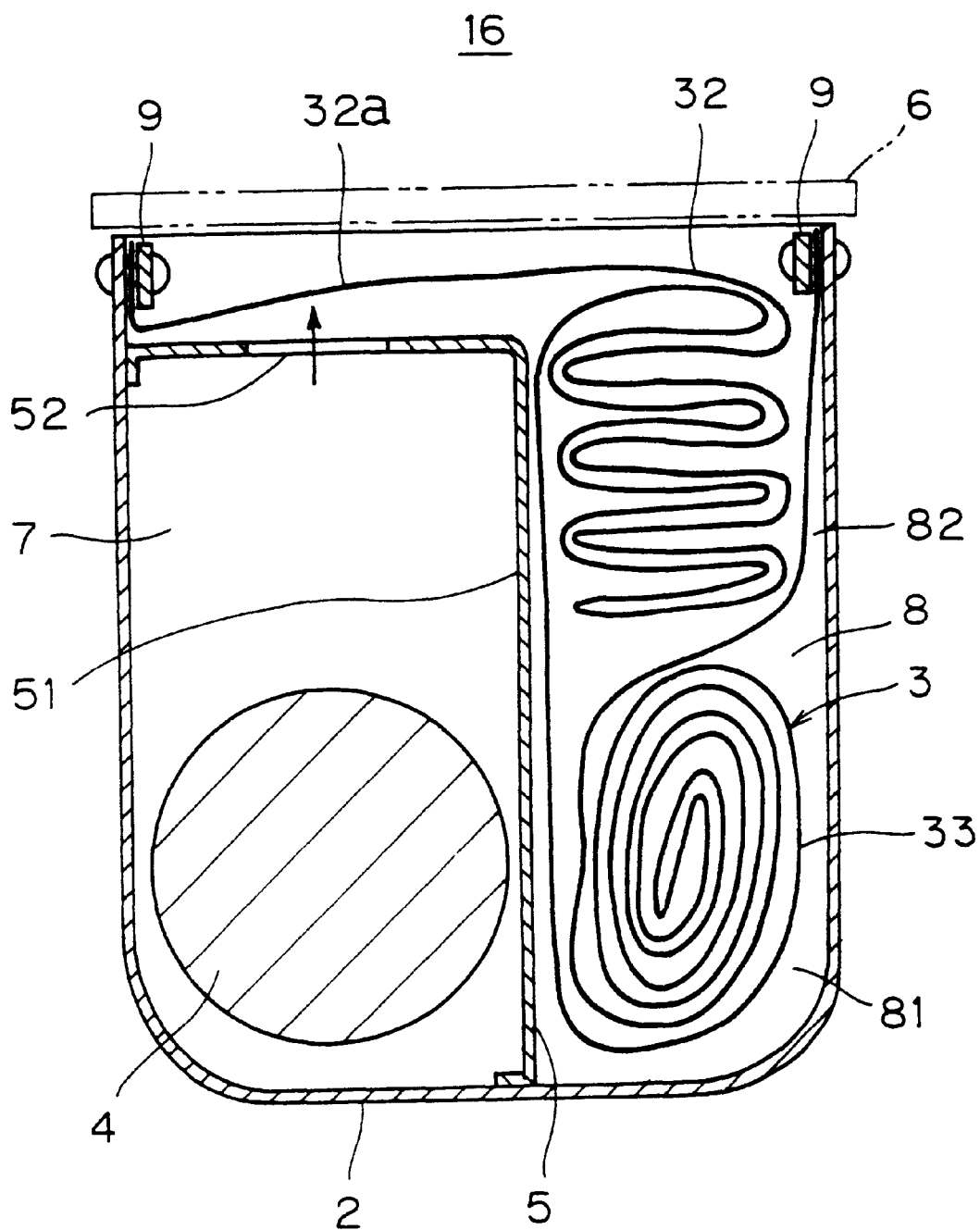
FIG. 14 is a vertical sectional view of an air bag device 16 of a sixth preferred embodiment of the invention.

FIG. 14 is a sectional view of an air bag device 16 of a sixth preferred embodiment of the invention. This preferred embodiment differs from the fifth preferred embodiment described above in the point that the delivery openings 52 are provided at the exit end of the gas guiding passage 7.

In this preferred embodiment, the folding structure of the air bag 3 is such that the air bag upper part 32 is folded in bellows form and the air bag lower part 33 is folded in roll form, as in the third preferred embodiment.

Figure 15:
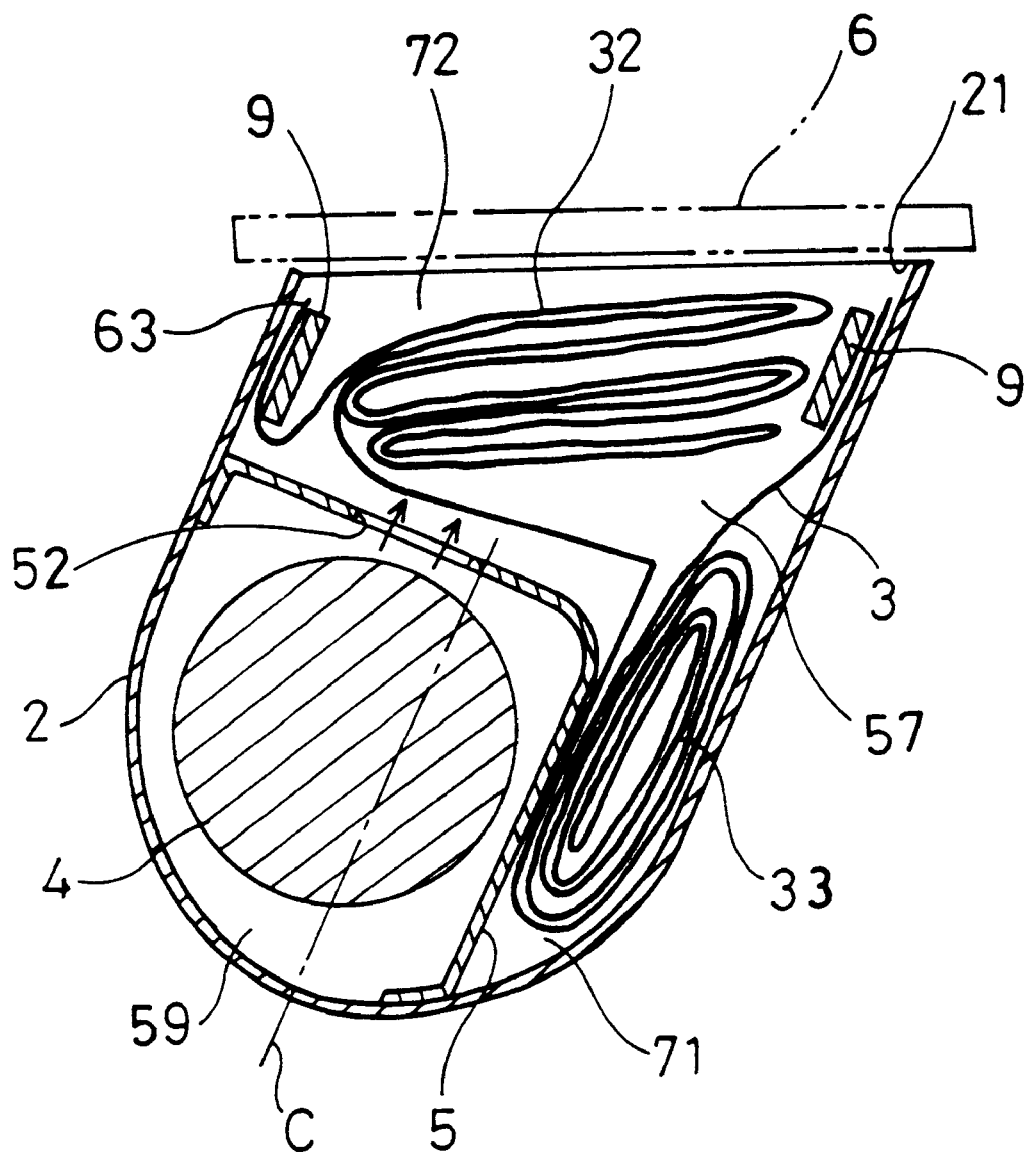
FIG. 15 is a vertical sectional view of an air bag device 17 of a seventh preferred embodiment of the invention.

FIG. 15 is a sectional view of an air bag device 17 of a seventh preferred embodiment of the invention.

Like the air bag device of the first preferred embodiment, this air bag device 17 also is mounted in an instrument panel in front of the passenger seat of a car and has a case 2, an air bag 3, an inflator 4, a diffuser 5 and a cover 6 and is constructed so that, in the event of a collision, gas generated by the inflator 4 inflates the air bag 3 toward the rear of the vehicle to catch the body of the passenger.

In this preferred embodiment, the case 2 has a substantially U-shaped cross-section having a curved bottom and is inclined toward the front of the vehicle with progress downward.

The inflator 4 fitted at the bottom of the case 2 is disposed slightly on the vehicle front side, i.e. the side further from the passenger, of the front-rear direction center C of the case 2. More specifically, the inflator 4 is disposed in the proximity of the bottom and the side wall further from the passenger of the case 2.

The diffuser 5 is mounted on the inside of the case 2 so as to cover the inflator 4 from the passenger side and the case opening 21 side. This diffuser 5 divides the inside of the case 2 into a receiving space 59 for the inflator 4 and a receiving space 57 for the air bag 3. The receiving space 57 for the air bag 3 is made up of a first receiving part 71 formed on the passenger side of the inflator 4 between a passenger side wall of the diffuser 5 and the passenger side wall of the case 2 and a second receiving part 72 formed on the case opening 21 side of the inflator 4 above a case opening side wall of the diffuser 5. A gas delivery opening 52 guiding gas generated by the inflator 4 into the second receiving part 72 for the air bag 3 is provided in the case opening side wall of the diffuser 5.

The air bag 3, as shown in FIG. 16A, is a bag sewn in a three-dimensional shape using a cloth made of a synthetic fiber or the like and having a mounting opening 63, and this opening 63 is attached to the inner side of the case opening 21 by means of rivets or the like and an air bag retainer 9. This air bag 3 is folded in a predetermined form and a folded portion of an air bag lower part 33 to constitute a lower part of the deployed air bag is received in the first receiving part 71 and a folded portion of the air bag upper part 32 is received in the second receiving part 72. That is, the air bag 3 is folded so that the upper part 32 and the lower part 33 thereof each form a folded portion, and these folded portions are received in the respective receiving parts 71, 72.

More specifically, the air bag 3 is spread in a plane by the upper part 32 and the lower part 33 of the air bag 3 being pulled up and down, as shown in FIG. 16B. Then, from this spread state, left and right side parts 34, 34 are folded in to the inner side of fold lines 34a, 34a at the side of mounting to the case 2, as shown in FIG. 16C. The left and right side parts 34, 34 are then each folded in bellows form to form a vertically long bandlike body 35. That is, the left and right side parts 34, 34 are each folded at a series of locations 34b, 34c located between the middle of the air bag 3 and its left and right edges and a plurality of folds are successively superposed on that middle part to form the bandlike body 35. As shown in FIG. 16D, a folded body is obtained by folding the upper side of this bandlike body 35, i.e. the air bag upper part 32, in bellows form and folding the lower side of the bandlike body 35, i.e. the air bag lower part 33, in roll form. That is, for the air bag upper part 32 the bandlike body 35 is folded at the series of locations 35a, 35b, 35c, 35d, 35e located between the middle and the top edge of the bandlike body 35 with the plurality of folds being successively superposed, and for the air bag lower part 33 the lower side of the bandlike body 35 is folded in a roll so that the lower edge 35f of the bandlike body 35 is on the inside.

The air bag lower part 33 folded in roll like this is received in the first receiving part 71 as shown in FIG. 15 and then the air bag upper part 32 folded in bellows form is received in the second receiving part 72 so as to cover the upper face of the air bag lower part 33.

Figure 17A:
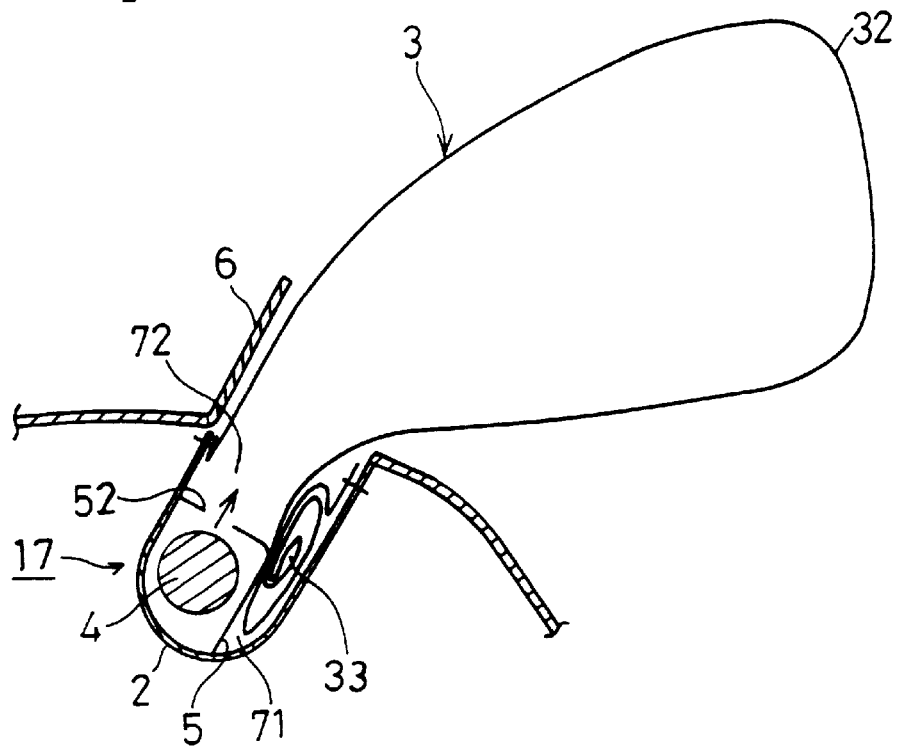
FIG. 17A and FIG. 17B are sectional views showing the deployment behavior of an air bag in the air bag device 17.
Figure 17B:
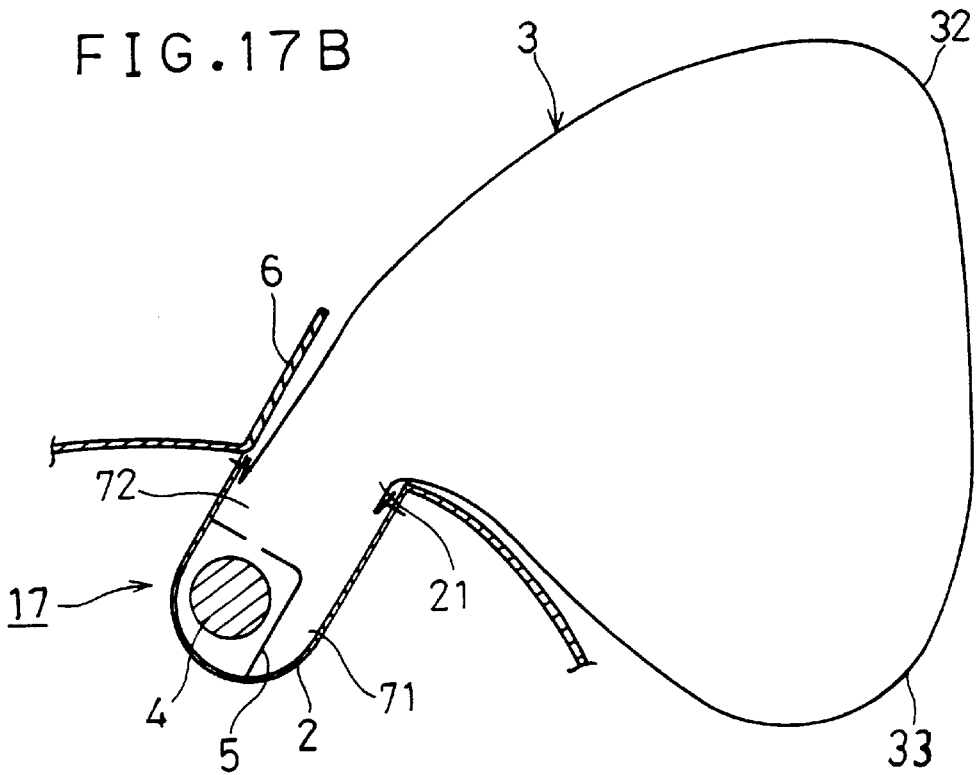

In this air bag device 17, as shown in FIG. 17A, in the event of a vehicle collision, gas generated by the inflator 4 expands the folded portion of the air bag upper part 32 early and thereby forms a surface for restraining the passenger, and then, as shown in FIG. 17B, the folded portion of the air bag lower part 33 rapidly expands while being pulled out by the air bag upper part 32.

Thus, with this air bag device 17, by the folded portions of the air bag upper part 32 and the air bag lower part 33 of the air bag 3 being received separately, it is possible to control the deployment behavior of the air bag 3 so that the air bag upper part 32 is expanded early and the air bag lower part 33 is expanded rapidly thereafter.

Also, because the air bag 3 is received divided between the second receiving part 72 above the inflator 4 and the first receiving part 71 on the passenger side, the area of the case opening is not made large as in the conventional parallel arrangement type described above wherein the air bag and the inflator are simply disposed one in front of the other.

Therefore, with the air bag device 17 of this preferred embodiment it is possible to control the deployment behavior of the air bag 3 while keeping the air bag device compact.

In particular, because the gas generated by the inflator 4 is blown through the gas delivery openings 52 of the diffuser 5 to the second receiving part 72 side and also the air bag upper part 32 received in this second receiving part 72 is folded in bellows form, the expansion of this air bag upper part 32 is made faster, and more certain control of the deployment behavior becomes possible.

Here, from the point of view of making the area of the case opening small, the front-rear direction dimension of the first receiving part 71 is preferably made as small as is possible with it still being possible for the folded portion of the air bag lower part 33 to be received in it.

In this preferred embodiment, a case wherein a diffuser 5 is provided was described, and this diffuser 5 is particularly effective in cases where a so-called hybrid type inflator having a gas blowout part at one end is used as the inflator 4. When an inflator of a type having a gas blowout part extending along its entire length is used as the inflator 4, the diffuser 5 is not essential.

Also, although in the above the air bag upper part 32 was folded in bellows form and the air bag lower part 33 was folded in roll form, their folding structure is not limited to this and can be made another folding structure according to the shape of the air bag 3 and the elements constituting the device. For example, both the air bag upper part 32 and the lower part 33 may be folded in roll form or both in bellows form.

Figure 18:
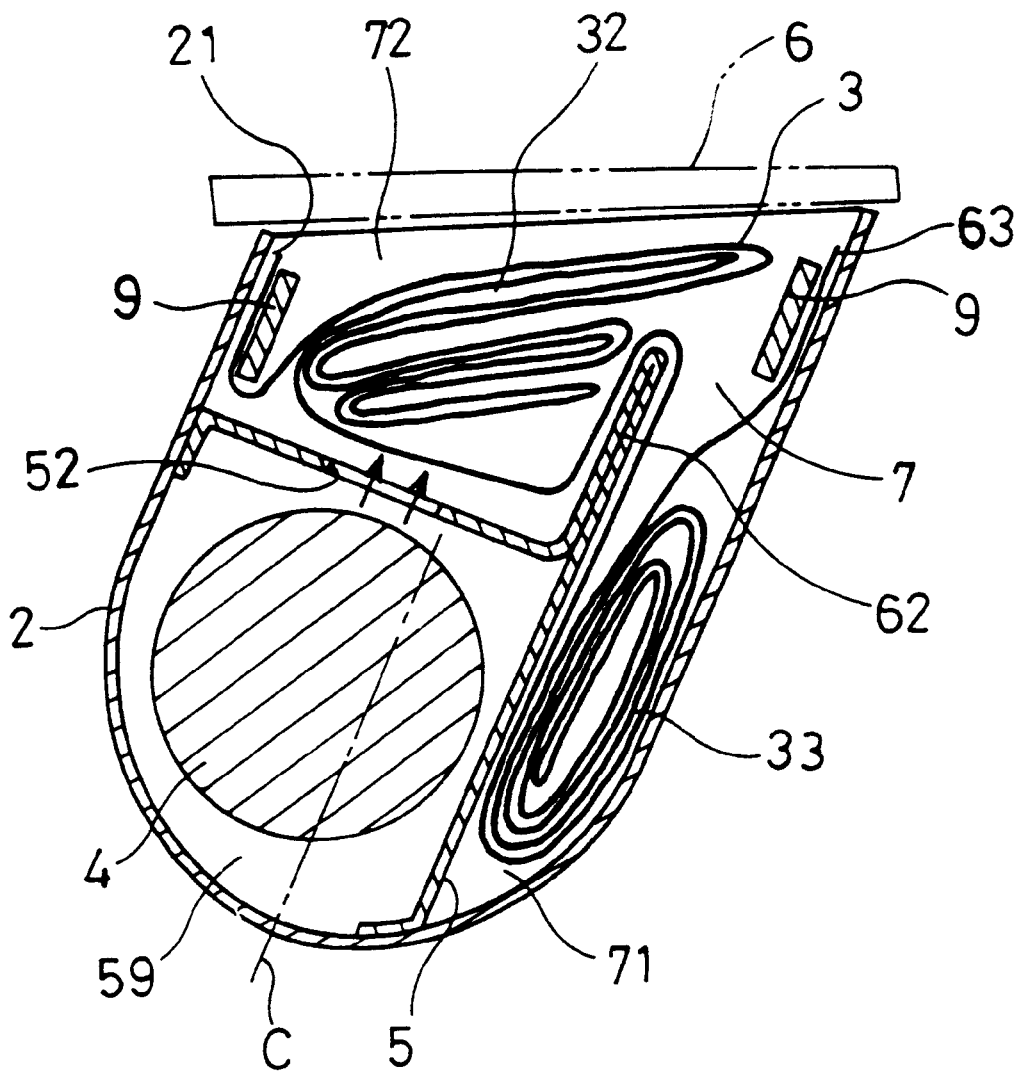
FIG. 18 is a vertical sectional view of an air bag device 18 of an eighth preferred embodiment of the invention.

FIG. 18 is a sectional view of an air bag device 18 of an eighth preferred embodiment of the invention. This preferred embodiment is basically similar to the seventh preferred embodiment described above but has the feature that the passenger side wall of the diffuser 5 is extended toward the case opening 21 and this extension part constitutes a partition wall 62 partitioning the first receiving part 71 and the second receiving part 72 for the air bag 3. This partition wall 62 is formed extending across the entire width of the case 2.

In this preferred embodiment, because gas blown out into the second receiving part 72 through the gas delivery openings 52 of the diffuser 5 can be more preferentially guided to the folded portion of the air bag upper part 32, it is possible to effect the above-mentioned deployment behavior control more smoothly.

In this preferred embodiment also, as in the case of the seventh preferred embodiment, as the folding structure of the air bag 3, the air bag upper part 32 and the air bag lower part 33 may be both folded in roll form or both folded in bellows form.

Figure 19:
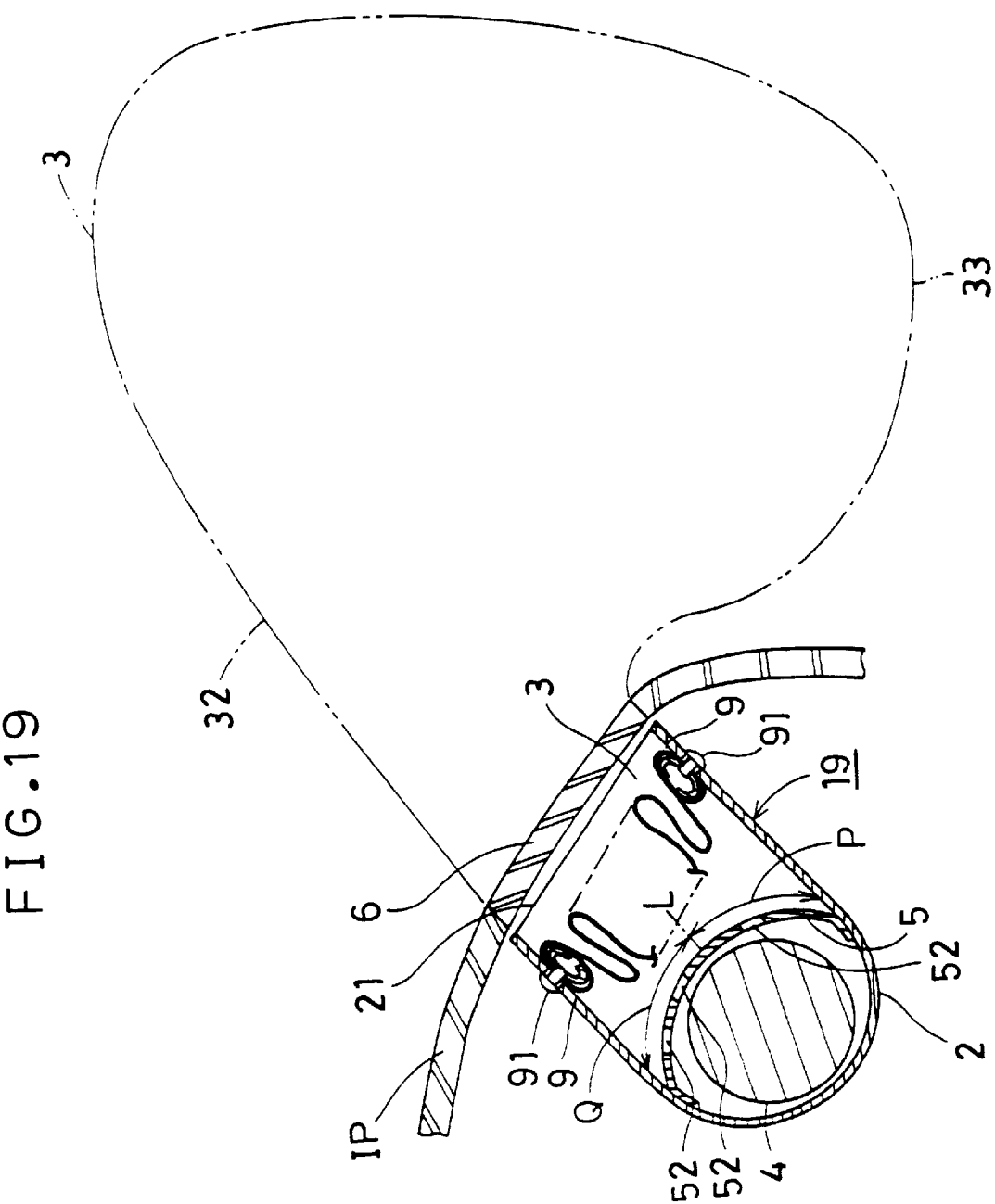
FIG. 19 is a sectional view of an air bag device 19 of a ninth preferred embodiment of the invention mounted in a vehicle.
Figure 20:
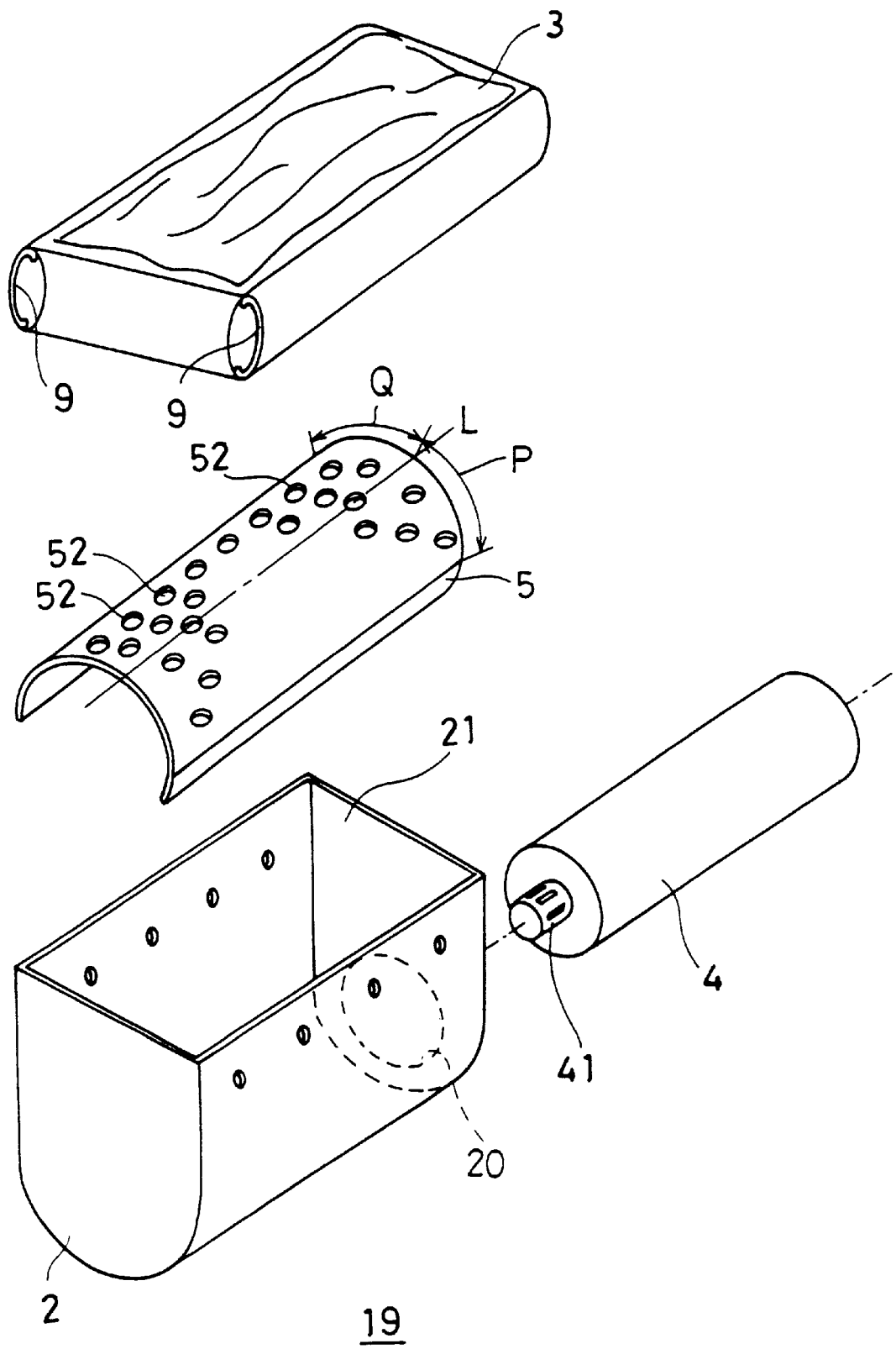
FIG. 20 is an exploded perspective view of the air bag device 19.

FIG. 19 is a sectional view showing an air bag device 19 of a ninth preferred embodiment of the invention mounted in a vehicle, and FIG. 20 is an exploded perspective view of this air bag device 19.

This air bag device 19 is mounted in an instrument panel IP in front of the passenger seat of a car, and has an air bag 3, an inflator 4 and a diffuser 5 received inside an upwardly opening case 2.

The case 2 is a boxlike container rectangular in horizontal cross-section and formed with a substantially U-shaped cross-section and having a curved bottom part. A cylindrical inflator 4 is disposed in this curved bottom part of the case 2 so that the axial direction of the inflator 4 is the length direction of the case 2, and a fitting hole 20 for fitting the inflator 4 is provided in one of the end walls of the case 2.

The air bag 3 is attached to the inner side of the rectangular case opening 21 in a folded or rolled state. The part of the air bag 3 around its opening is attached to the case 2 by rivets 91 and a pair of bag retainers 9 extending in the length direction of the case 2.

The inflator 4 is connected to a control part (not shown) and, under predetermined conditions such as at the time of a vehicle collision, blows gas into the case 2 and inflates the air bag 3 out through the case opening 21, i.e. to the passenger side. This inflator 4 is a hybrid type charged with high-pressure gas, and has a gas blowout part 41 at one end.

The diffuser 5 is a sheet metal member for regulating the flow of gas generated by the inflator 4 and is disposed between the inflator 4 and the air bag 3 and attached to the inside of the case 2 by welding, rivets or nuts and bolts. This diffuser 5 is formed curving convexly upward following the top of the inflator 4 with the axial direction of the inflator 4 as its length direction, so as to cover top of the inflator 4, and partitions the bottom space of the case 2 in which the inflator 4 is disposed from a space thereabove.

A plurality of gas delivery openings 52 for guiding gas generated by the inflator 4 into the air bag 3 are formed in the diffuser 5 in an opening provision area thereof, which is the part of the diffuser 5 covering the inflator 4.

As shown in FIG. 19, this air bag device 19 is installed in a vehicle with the length direction of the case 2 made the vehicle width direction and the upwardly opening case opening 21 inclined to the passenger side. That is, the case opening 21 faces upward and also toward the passenger side. The inflator 4 is disposed so that its axial direction is the width direction of the vehicle and the diffuser 5 is disposed so that its length direction is the width direction of the vehicle.

The case opening 21 is covered by a cover 6 made of a synthetic resin. This cover 6 has a substantially rectangular shape matching the shape of the case opening 21 and is formed integrally with the instrument panel IP of the vehicle, and is constructed to be ruptured or opened like a door by the inflation pressure of the air bag 3 and allow the air bag 3 to deploy to the passenger side.

The pattern of the plurality of gas delivery openings 52 formed in the diffuser 5 will now be described.

The opening provision area of the diffuser 5 is divided into two equal parts by a centerline L of the diffuser 5 extending in the length direction (the vehicle width direction) thereof, and when the region on the passenger side of this centerline L is called the passenger side region P and the region on the opposite side is called the side region further from the passenger Q, the above-mentioned plurality of gas delivery openings 52 are disposed mostly in the side region further from the passenger Q so that their opening area in the side region further from the passenger Q is greater than that in the passenger side region P. That is, the sum total of the areas of the gas delivery openings 52 disposed in the side region further from the passenger Q is greater than the sum total of the areas of the gas delivery openings 52 disposed in the passenger side region P. In this preferred embodiment, the opening area in the side region further from the passenger Q is set to more than 80% of the total area of all the gas delivery openings 52 provided in the diffuser 5.

Figure 21:
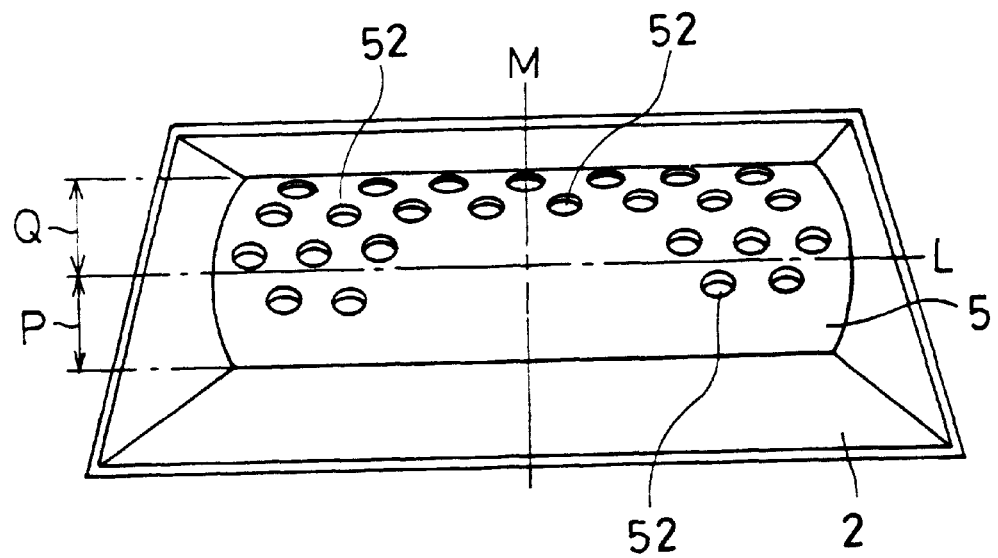
FIG. 21 is a plan view showing the opening pattern of a diffuser 5 of the air bag device 19.

As shown in FIG. 21, this plurality of gas delivery openings 52 consists of a set of substantially circular small holes, and their opening pattern is left-right symmetrical, i.e. symmetrical with respect to a centerline M crossing the diffuser 5 in its width direction. So that the opening area is greater at the left and right ends of the diffuser 5 than in the middle, more gas delivery openings (i.e. small holes) 52 are formed at the ends than in the middle.

With this air bag device 19, as shown in FIG. 19, the part to constitute the upper part 32 of the deployed air bag 3 is disposed in the side of the case 2 further from the passenger and the part to constitute the lower part 33 of the bag is disposed in the passenger side of the case 2. Consequently, gas blown through the gas delivery openings 52 disposed in the side region further from the passenger Q of the diffuser 5 is guided to the part constituting the air bag upper part 32 and gas blown through the gas delivery openings 52 disposed in the passenger side region P of the diffuser 5 is guided to the part constituting the air bag lower part 33. Because the opening area in the side region further from the passenger Q of the diffuser 5 is set greater than the opening area of the passenger side region P, gas blown out of the inflator 4 into the bottom of the case 2 is preferentially guided to the part of the air bag 3 constituting the upper part 32. Consequently, the upper part 32 of the air bag 3 inflates first and then the air bag lower part 33 inflates rapidly after that to produce the predetermined deployed shape shown in FIG. 19. In other words, the air bag 3 shows a good deployment behavior.

In particular, because the opening area of the side region further from the passenger Q of the diffuser 5 is set to at least 80% of the total opening area of the diffuser 5, ample preferential guiding of gas into the upper part 32 of the air bag 3 is obtained and certain deployment control is made possible.

Because the shape of the air bag 3 when it deploys is controlled by presetting the opening pattern of the diffuser 5 in this way, it is not necessary to separately provide deployment controlling means such as tethers and tear seams on the air bag as has been done in the related art, and consequently it is possible to obtain good deployment behavior of the air bag 3 easily, without there being accompanying problems such as increases in the volume of the air bag package or increases in cost.

Also, because the opening pattern of the diffuser 5 is left-right symmetrical in the diffuser 5, gas is guided equally into the left and right sides of the air bag 3 and consequently left-right symmetrical deployment of the air bag 3 is possible.

Also, because the opening area of the left and right ends of the diffuser 5 is set greater than that of the middle of the diffuser 5, inflation of the sides of the air bag 3 is promoted and the air bag 3 shows better deployment behavior.

Furthermore, because the gas delivery openings 52 consist of a set of small, substantially circular holes, the gas flow regulating effect of the diffuser 5 is good.

Figure 22:
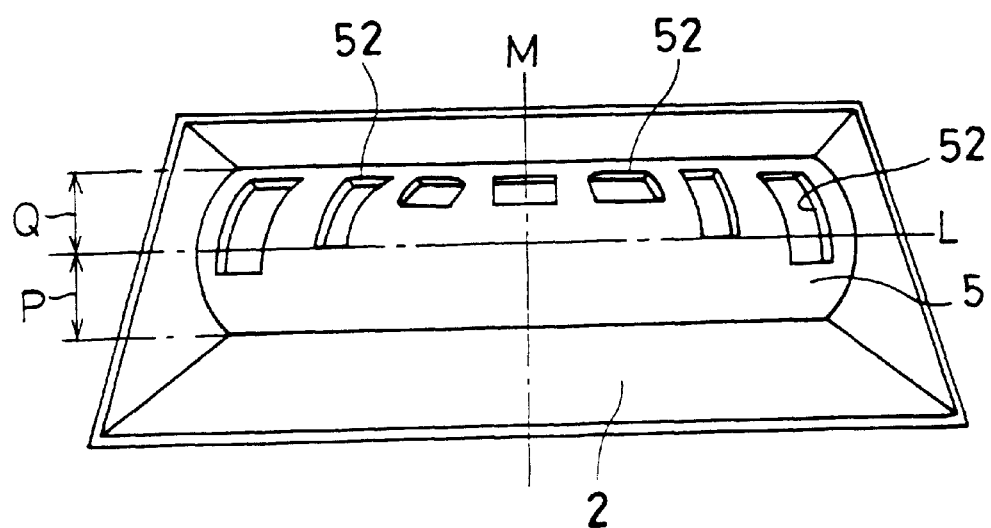
FIG. 22 is a plan view showing another example of an opening pattern of the diffuser 5.
Figure 23:
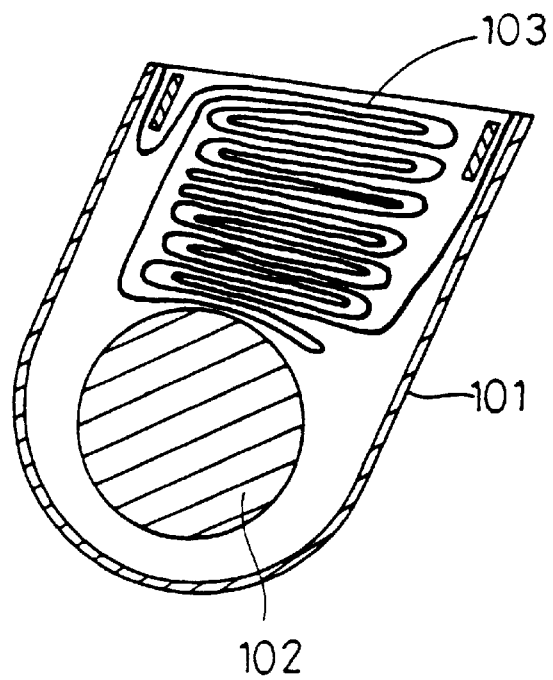
FIG. 23 is a vertical sectional view of an air bag device of the related art.
Figure 24:
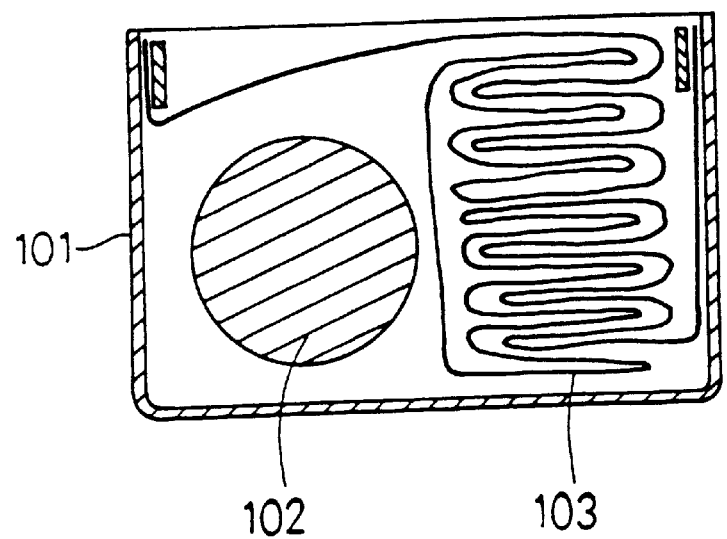
FIG. 24 is a vertical sectional view of another air bag device of the related art.

FIG. 22 shows a modification example of the opening pattern of the diffuser 5. In this modification example, the plurality of gas delivery openings 52 is a plurality of rectangular openings arrayed in the length direction of the diffuser 5. In this case also, the opening area of the side region further from the passenger Q of the diffuser 5 is set greater than that in the passenger side region P and the pattern of the openings is left-right symmetrical. In this case, by the sizes of the gas delivery openings 52, and more specifically the lengths of rectangular gas delivery openings 52 extending around the curved surface of the diffuser 5, being made smaller (more specifically, shorter) in the middle of the diffuser 5 and larger (more specifically, longer) at the ends of the diffuser 5, the opening area of the left and right ends of the diffuser 5 is made greater than that in the middle of the diffuser 5.

In the preferred embodiment described above, a case wherein the air bag device 19 is installed in a vehicle with its case opening 21 facing upward and inclined toward the passenger side was described, but the invention is not limited to this and includes for example air bag devices wherein the case opening 21 faces vertically upward.

The invention is not limited to air bag devices for passenger seat use and can also be applied to air bag devices for driver's seat use and other air bag devices.

What is claimed is:

1. An air bag device, comprising:

a case;

a substantially cylindrical inflator, an air bag inflated by gas generated by the inflator, and a diffuser received within the case, said diffuser being disposed in a position covering the inflator for regulating flow of the gas;

said diffuser being provided with gas delivery openings for guiding gas generated by the inflator into the air bag; and said gas delivery openings being disposed such that an opening area defined by a portion of said gas delivery openings on a side on which an air bag upper part for constituting an upper part of the deployed air bag is fitted is greater than an opening area defined by another portion of said gas delivery openings on a side on which an air bag lower part for constituting a lower part of the deployed air bag is fitted such that gas is guided into the air bag upper part more than into the air bag lower part, said gas delivery openings being arranged in the diffuser left-right symmetrically, an opening area defined by a portion of said gas delivery openings at left and right ends of the diffuser being greater than an opening area of another portion of said gas delivery openings in a middle of the diffuser.

2. An air bag device according to claim 1, wherein the opening area of said portion of said gas delivery openings on the side on which the air bag upper part is fitted is set to at least 80% of the total opening area of an aggregate of said gas delivery openings of the diffuser.

3. An air bag device according to claim 1, wherein said gas delivery openings are a set of substantially circular small holes.

4. An air bag device, comprising:

a case mountable in an upwardly disposed opening in a vehicle;

a substantially cylindrical inflator, an air bag inflated to a passenger side by gas generated by the inflator for protection of a passenger seated a distance therefrom, and a diffuser for regulating the flow of the gas;

said inflator being disposed at a bottom of the case, an axial direction thereof extending in the width direction of the vehicle;

the diffuser being a plate member, a length direction thereof codirectional with the axial direction of the inflator, said diffuser being disposed in a position covering the inflator and including gas delivery openings for guiding gas generated by the inflator into the air bag formed in the diffuser; and said gas delivery openings being disposed such that an opening area defined by a portion of said gas delivery openings on a side of a longitudinal centerline of the diffuser distant from the passenger is greater than an opening area defined by another portion of said gas delivery openings on an opposite side of the longitudinal centerline of the diffuser closer to the passenger, said gas delivery openings being arranged in the diffuser left-right symmetrically, an opening area of a portion of said gas delivery openings at left and right ends of the diffuser being greater than an opening area of another portion of said gas delivery openings in a middle of the diffuser.

5. An air bag device according to claim 4, wherein the opening area of the portion of the gas delivery openings on the side of the longitudinal centerline of the diffuser distant from the passenger is set to at least 80% of the total opening area of an aggregate of said gas delivery openings of the diffuser.

* * * * *